(12) United States Patent
Matsumoto et al.

(10) Patent No.: US 6,222,681 B1
(45) Date of Patent: *Apr. 24, 2001

(54) ZOOM LENS SYSTEM

(75) Inventors: Hiroyuki Matsumoto, Wakayama; Osamu Okubo, Nakano; Akio Miyata, Tondabayashi, all of (JP)

(73) Assignee: Minolta, Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,059

(22) Filed: Aug. 28, 1997

(30) Foreign Application Priority Data

Aug. 30, 1996 (JP) ................................................. 8-229761
Aug. 30, 1996 (JP) ................................................. 8-229762

(51) Int. Cl.$^7$ ............................... G02B 15/22; G02B 15/14
(52) U.S. Cl. ............................ 359/693; 359/687; 359/684
(58) Field of Search .................................... 359/687, 693, 359/683, 684, 676, 686

(56) References Cited

U.S. PATENT DOCUMENTS

| Re. 32,923 | 5/1989 | Kreitzer | 359/687 |
|---|---|---|---|
| 4,113,355 | 9/1978 | Tsuji et al. | 359/693 |
| 4,132,463 | * 1/1979 | Sakaguchi et al. | 359/693 |
| 4,448,495 | * 5/1984 | Hayashi | 359/693 |
| 4,518,227 | * 5/1985 | Tajima | 359/693 |
| 4,770,511 | * 9/1988 | Yonezawa et al. | 359/693 |
| 4,818,083 | 4/1989 | Mihara | 359/687 |
| 4,859,042 | 8/1989 | Tanaka | 359/684 |
| 4,952,039 | 8/1990 | Ito | 359/687 |
| 5,530,590 | 6/1996 | Saito | 359/658 |
| 5,546,231 | 8/1996 | Sato | 359/687 |
| 5,585,966 | * 12/1996 | Suzuki | 359/687 |

FOREIGN PATENT DOCUMENTS 5-076009 3/1993 (JP) .

* cited by examiner

Primary Examiner—Scott J. Sugarman
Assistant Examiner—Jordan M. Schwartz
(74) Attorney, Agent, or Firm—Sidley & Austin

(57) ABSTRACT

A zoom lens system capable of macro-photography having, in the order from the object side, a first lens unit that has positive optical power and is fixed during zooming; a second lens unit that has negative optical power and moves along the optical axis during zooming; a third lens unit that has positive optical power and is fixed during zooming; and a fourth lens unit that has positive optical power and moves along the optical axis during zooming.

11 Claims, 17 Drawing Sheets

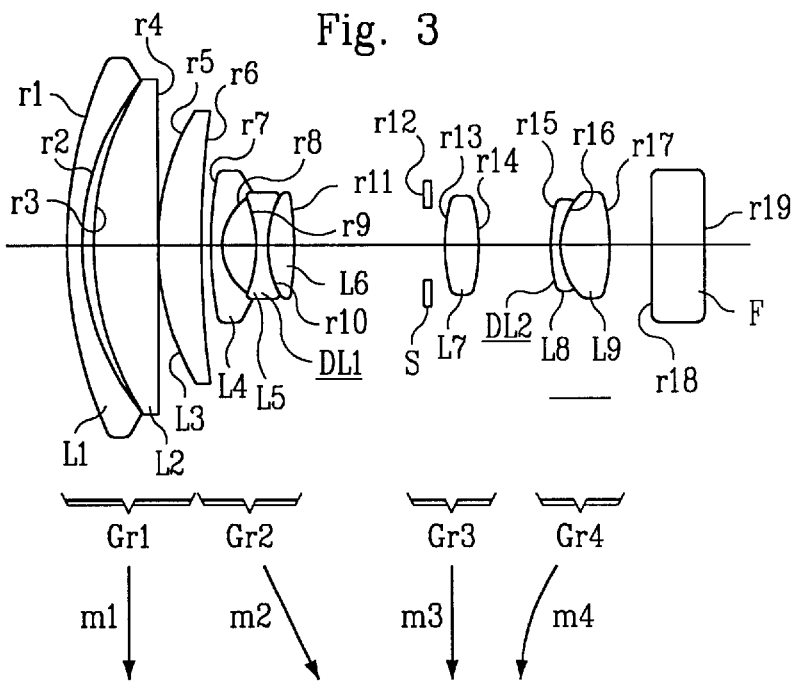
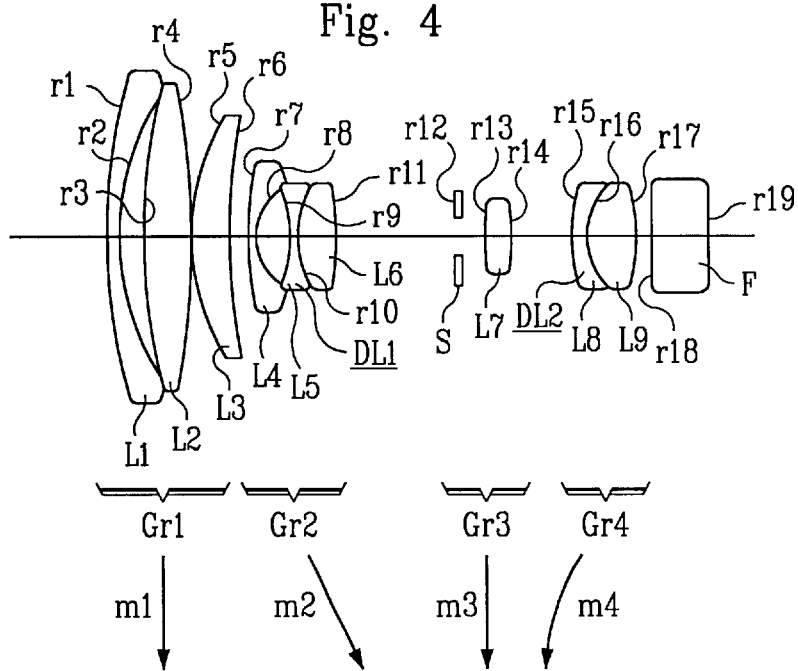

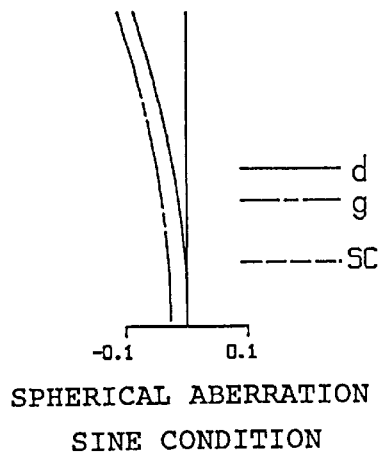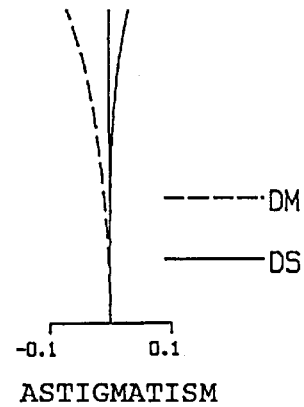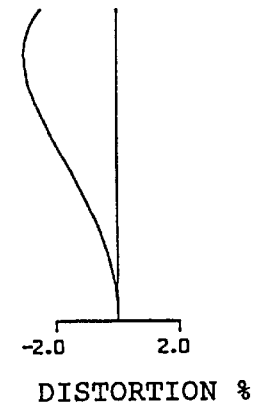
Fig.8A
FNO.=5.26
SPHERICAL ABERRATION
SINE CONDITION
Fig.8B
Y'=3.0
ASTIGMATISM
Fig.8C
Y'=3.0
DISTORTION %
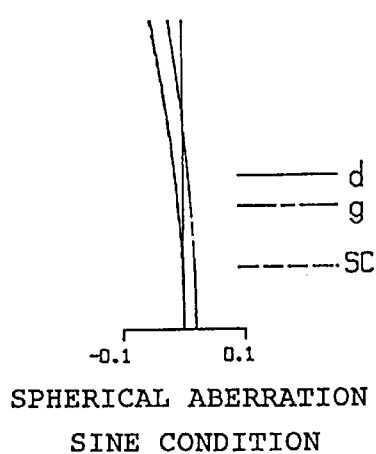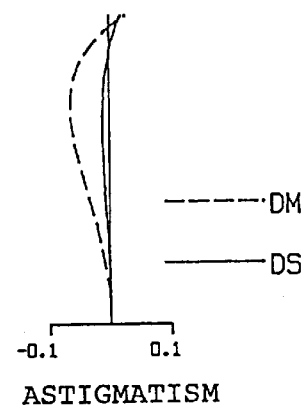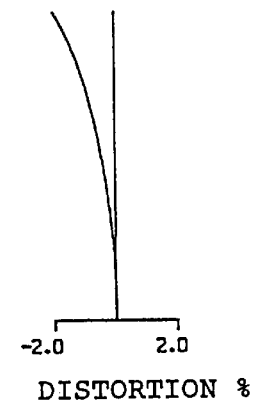
Fig.9A
FNO.=5.51
SPHERICAL ABERRATION
SINE CONDITION
Fig.9B
Y'=3.0
ASTIGMATISM
Fig.9C
Y'=3.0
DISTORTION %

FNO.=5.78

SPHERICAL ABERRATION
SINE CONDITION

Y'=3.0

ASTIGMATISM

Y'=3.0

DISTORTION %

FNO.=4.83

SPHERICAL ABERRATION
SINE CONDITION

Y'=3.0

ASTIGMATISM

Y'=3.0

DISTORTION %

FNO.=4.98

SPHERICAL ABERRATION
SINE CONDITION

Y'=3.0

ASTIGMATISM

Y'=3.0

DISTORTION %

FNO.=5.15

SPHERICAL ABERRATION
SINE CONDITION

Y'=3.0

ASTIGMATISM

Y'=3.0

DISTORTION %

FNO.=4.89

-0.1  0.1

SPHERICAL ABERRATION
SINE CONDITION

Y'=3.0

-0.1  0.1

ASTIGMATISM

Y'=3.0

-2.0  2.0

DISTORTION %

FNO.=5.19

-0.1  0.1

SPHERICAL ABERRATION
SINE CONDITION

Y'=3.0

-0.1  0.1

ASTIGMATISM

Y'=3.0

-2.0  2.0

DISTORTION %

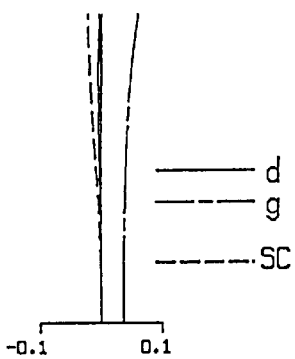 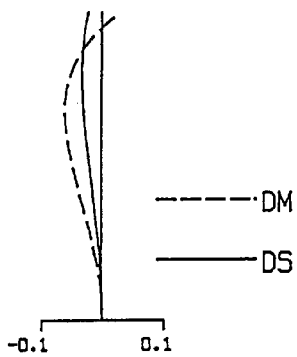 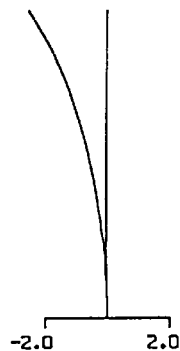
Fig.16A FNO.=5.53 — SPHERICAL ABERRATION SINE CONDITION
Fig.16B Y'=3.0 — ASTIGMATISM
Fig.16C Y'=3.0 — DISTORTION %
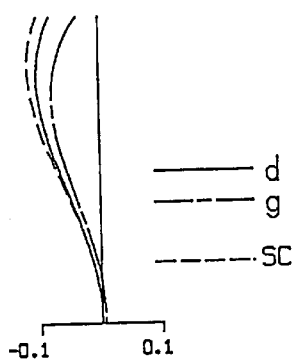 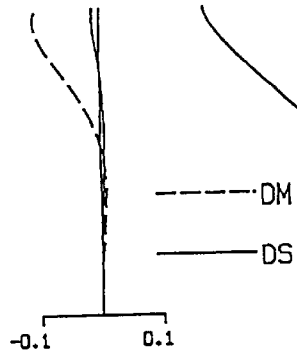 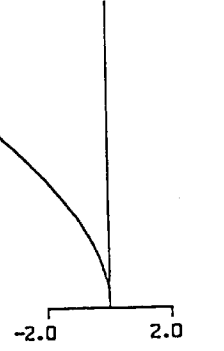
Fig.17A FNO.=2.19 — SPHERICAL ABERRATION SINE CONDITION
Fig.17B Y'=3.0 — ASTIGMATISM
Fig.17C Y'=3.0 — DISTORTION %

FNO.=2.59

SPHERICAL ABERRATION
SINE CONDITION

Y'=3.0

ASTIGMATISM

Y'=3.0

DISTORTION %

FNO.=2.88

SPHERICAL ABERRATION
SINE CONDITION

Y'=3.0

ASTIGMATISM

Y'=3.0

DISTORTION %

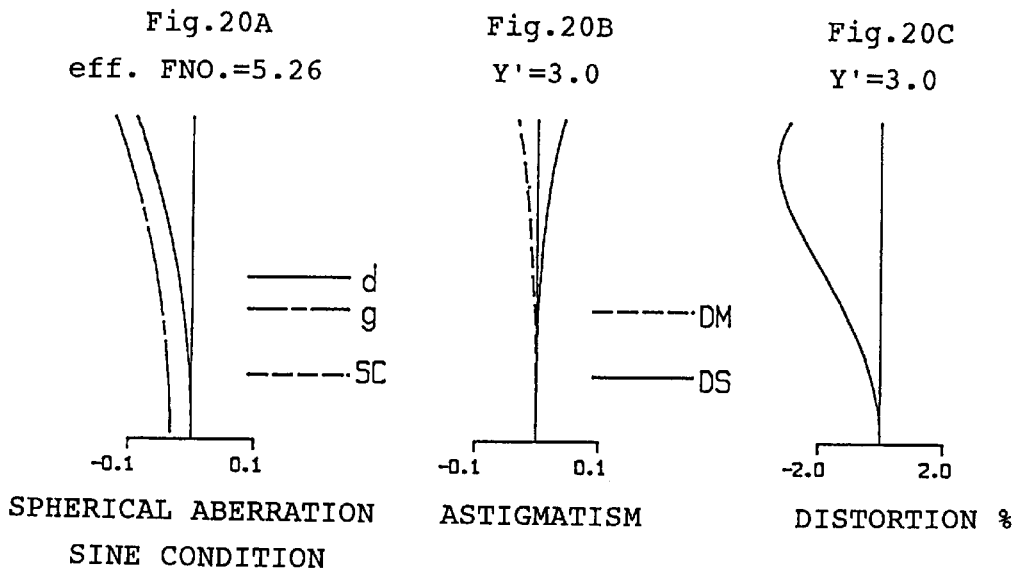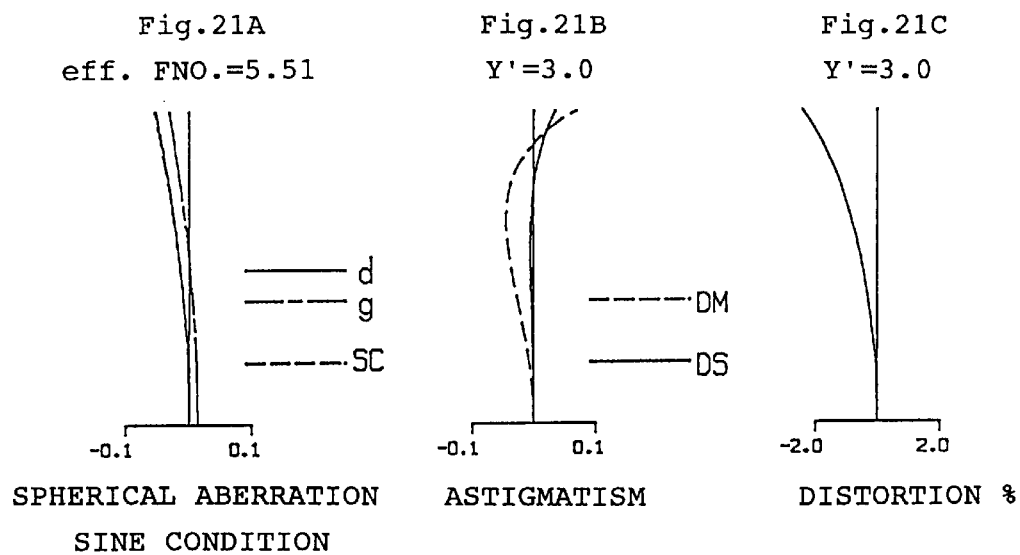

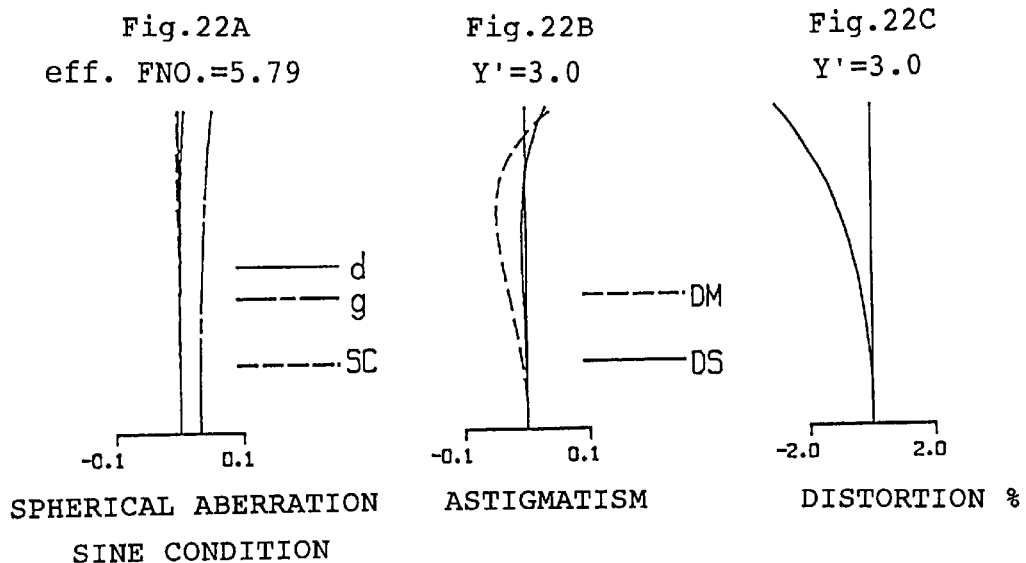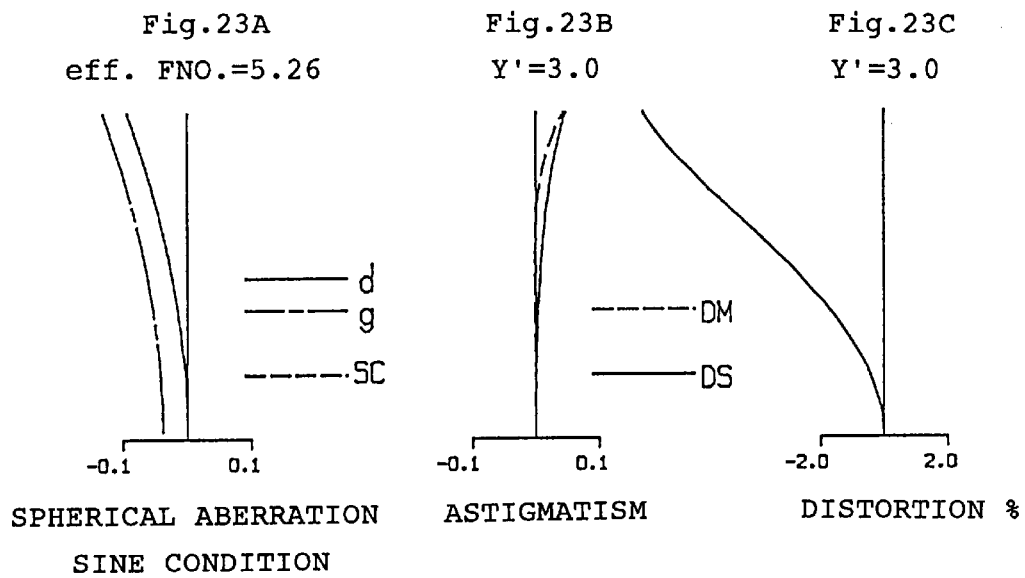

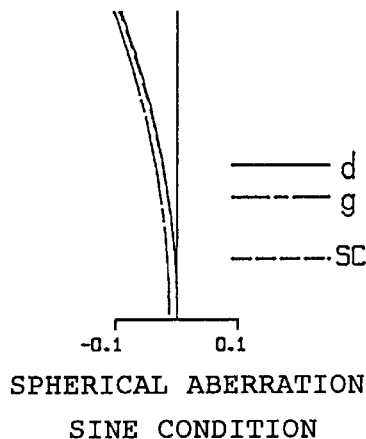
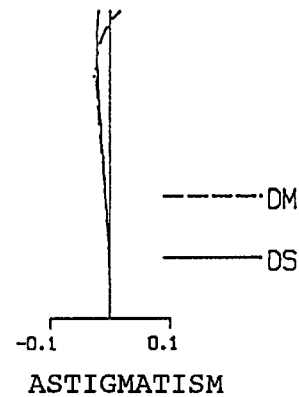
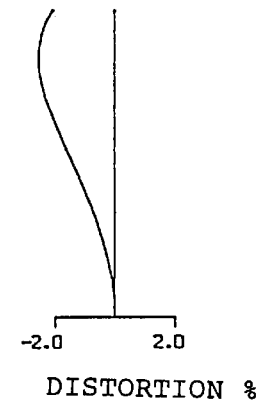
Fig.24A
eff. FNO.=4.80
SPHERICAL ABERRATION
SINE CONDITION
Fig.24B
Y'=3.0
ASTIGMATISM
Fig.24C
Y'=3.0
DISTORTION %
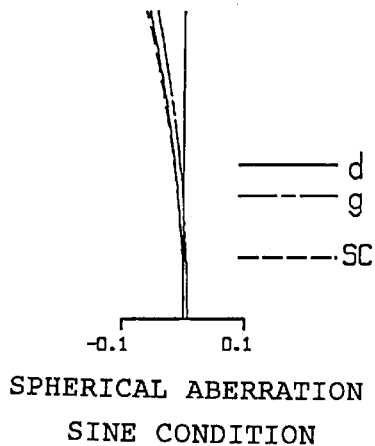
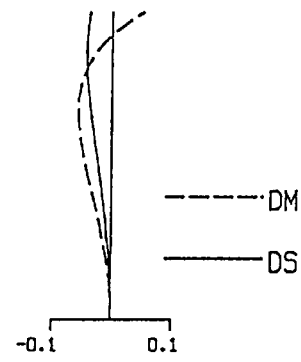
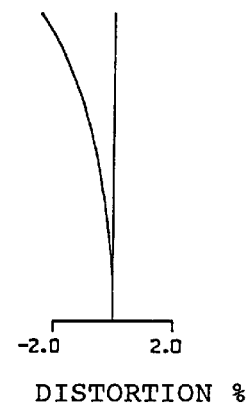
Fig.25A
eff. FNO.=4.96
SPHERICAL ABERRATION
SINE CONDITION
Fig.25B
Y'=3.0
ASTIGMATISM
Fig.25C
Y'=3.0
DISTORTION % eff. FNO.=5.17

SPHERICAL ABERRATION
SINE CONDITION

Y'=3.0

ASTIGMATISM

Y'=3.0

DISTORTION % eff. FNO.=4.80

SPHERICAL ABERRATION
SINE CONDITION

Y'=3.0

ASTIGMATISM

Y'=3.0

DISTORTION %

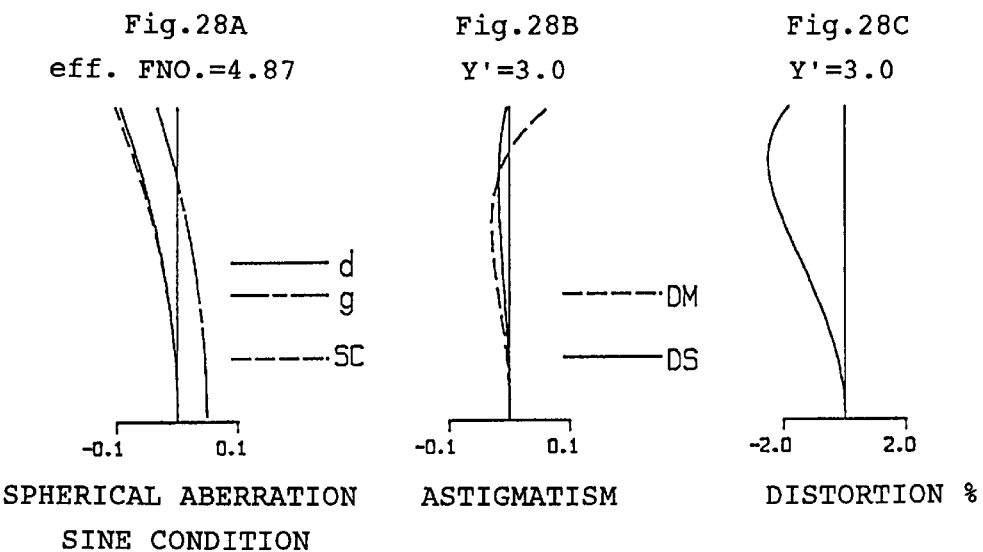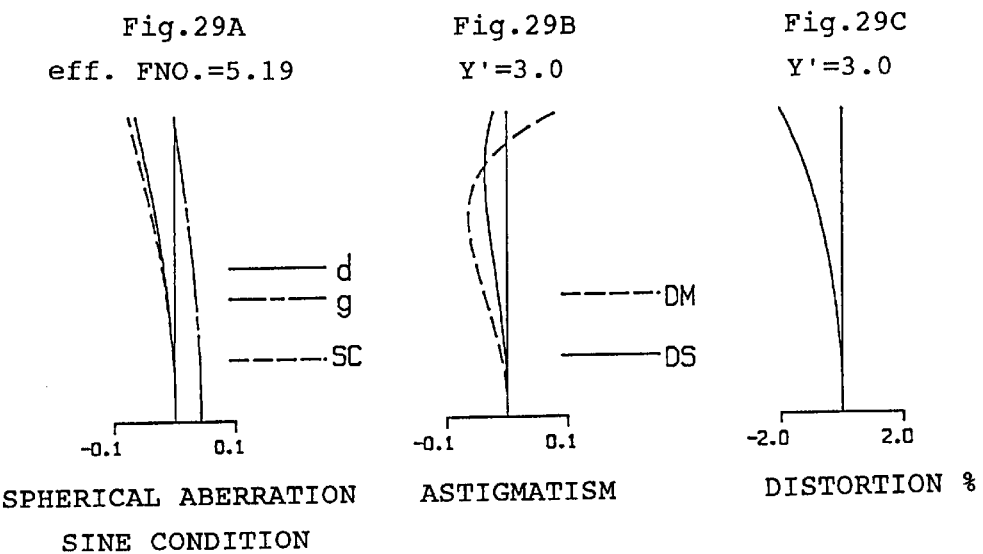

eff. FNO.=5.58

SPHERICAL ABERRATION
SINE CONDITION

Y'=3.0

ASTIGMATISM

Y'=3.0

DISTORTION % eff. FNO.=4.87

SPHERICAL ABERRATION
SINE CONDITION

Y'=3.0

ASTIGMATISM

Y'=3.0

DISTORTION %

ZOOM LENS SYSTEM

BACKGROUND OF THE INVENTION

1. Field of the Invention

The present invention pertains to a zoom lens system, and more particularly, to a zoom lens system suitable for the photo-taking optical system of a digital camera or lens shutter camera.

2. Background of the Invention

Various types of zoom lens systems for use in a digital camera or lens shutter camera have conventionally been proposed that comprise, from the object side, a first lens unit having positive optical power, a second lens unit having negative optical power, a third lens unit having positive optical power and a fourth lens unit having positive optical power.

However, in these conventional zoom lens systems, the focal length in the shortest focal length condition is around 40 mm if converted into a camera using 35 mm film. These zoom lens systems are therefore unsatisfactory for a user desiring a shorter focal length.

In addition, the need has increased in recent years for zoom lens systems for digital and lens shutter cameras that permit photo-taking of an object at close distance, and among the zoom lens systems having the optical power arrangement described above, a zoom lens system capable of macro-photography has been proposed (Japanese Published Patent Application 5-76009).

However, the zoom lens system disclosed in said patent application has a construction in which the lens units move along the optical axis in a complex manner for the purposes of photo-taking of an object at close distance (hereinafter macro-focusing) and changing the magnification. Therefore, it is necessary to manufacture the lens barrel with high precision. If the lens barrel is not manufactured with sufficiently high precision, the lens units would become decentered while moving for macro-focusing or zooming, which would lead to a marked deterioration of the image.

SUMMARY OF THE INVENTION

The object of the present invention is to provide a zoom lens system that has a shorter focal length in the shortest focal length condition than conventionally known zoom lens systems used in a digital camera or lens shutter camera, and that offers good aberration correction.

Another object of the preset invention is to provide a zoom lens system capable of performing macro-photography that has a simple construction and may be manufactured at low cost.

In order to attain these objects, the zoom lens system of the present invention has the following components arranged in the order shown from the object side:

a first lens unit that has positive optical power and is fixed during zooming;

a second lens unit that has negative optical power and moves along the optical axis during zooming;

a third lens unit that has positive optical power; and a fourth lens unit that has positive optical power, wherein said zoom lens system satisfies the following condition:

$$1.5 < \left|\frac{f_{1,2}}{f_w}\right| < 1.85$$

where $f_{1,2}$: combined focal length of the first and second lens units in the shortest focal length condition;

$f_W$: focal length of the entire zoom lens system in the shortest focal length condition.

Another zoom lens system of the present invention has the following components arranged in the order shown from the object side:

a first lens unit that has positive optical power and is fixed during zooming;

a second lens unit that has negative optical power and moves along the optical axis during zooming;

a third lens unit that has positive optical power and is fixed during zooming; and a fourth lens unit that has positive optical power and moves along the optical axis during zooming, wherein said second lens unit is moved along the optical axis during macro-focusing.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 3 shows the lens arrangement of Embodiment 3 in the shortest focal length condition when the zoom lens system is in focus regarding an object at infinity.

FIG. 4 shows the lens arrangement of Embodiment 4 in the shortest focal length condition when the zoom lens system is in focus regarding an object at infinity.

FIGS. 8A through 8C show the aberrations of the zoom lens system pertaining to Embodiment 1 in the shortest focal length condition when it is in focus regarding an object at infinity.

FIGS. 9A through 9C show the aberrations of the zoom lens system pertaining to Embodiment 1 in the middle focal length condition when it is in focus regarding an object at infinity.

FIGS. 16A through 16C show the aberrations of the zoom lens system pertaining to Embodiment 3 in the longest focal length condition when it is in focus regarding an object at infinity.

FIGS. 17A through 17C show the aberrations of the zoom lens system pertaining to Embodiment 4 in the shortest focal length condition when it is in focus regarding an object at infinity.

FIGS. 20A through 20C show the aberrations of the zoom lens system pertaining to Embodiment 5 in the shortest focal length condition during normal focusing (object distance 3 m).

FIGS. 21A through 21C show the aberrations of the zoom lens system pertaining to Embodiment 5 in the middle focal length condition during normal focusing (object distance 3 m).

FIGS. 22A through 22C show the aberrations of the zoom lens system pertaining to Embodiment 5 in the longest focal length condition during normal focusing (object distance 7 m).

FIGS. 23A through 23C show the aberrations of the zoom lens system pertaining to Embodiment 5 in the shortest focal length condition during macro-focusing (object distance 0.065 m).

FIGS. 24A through 24C show the aberrations of the zoom lens system pertaining to Embodiment 6 in the shortest focal length condition during normal focusing (object distance 3 m).

FIGS. 25A through 25C show the aberrations of the zoom lens system pertaining to Embodiment 6 in the middle focal length condition during normal focusing (object distance 3 m).

FIGS. 28A through 28C show the aberrations of the zoom lens system pertaining to Embodiment 7 in the shortest focal length condition during normal focusing (object distance 3 m).

FIGS. 29A through 29C show the aberrations of the zoom lens system pertaining to Embodiment 7 in the middle focal length condition during normal focusing (object distance 3 m).

DETAILED DESCRIPTION OF THE PREFERRED EMBODIMENTS

The zoom lens system in which the present invention is implemented is explained below with reference to the drawings. In the explanation in this specification, the term 'optical power' will be defined as the reciprocal number of the focal length and may be used for a refracting surface, a diffracting surface or a combination of a refracting surface and a diffracting surface.

Figure 1:
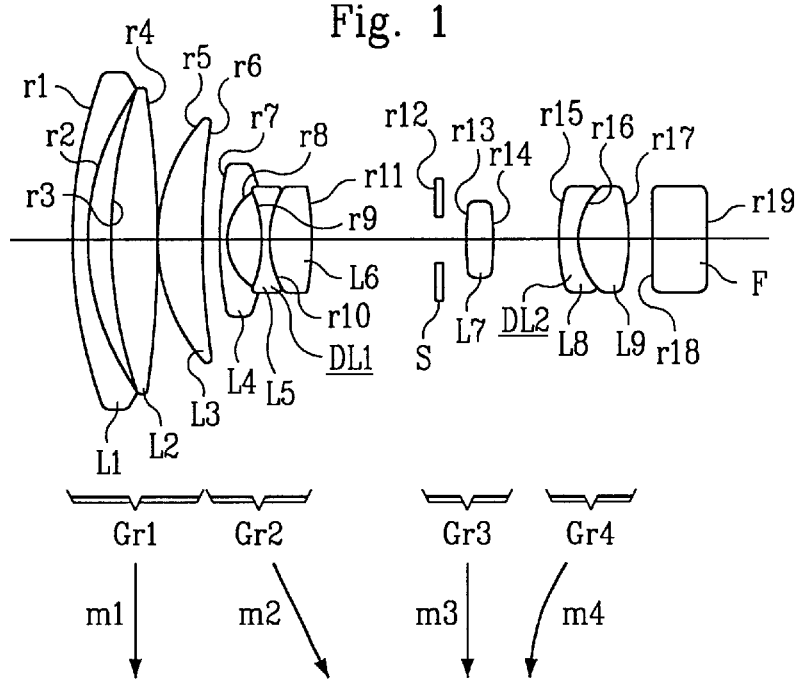
FIG. 1 shows the lens arrangement of Embodiment 1 in the shortest focal length condition when the zoom lens system is in focus regarding an object at infinity.
Figure 2:
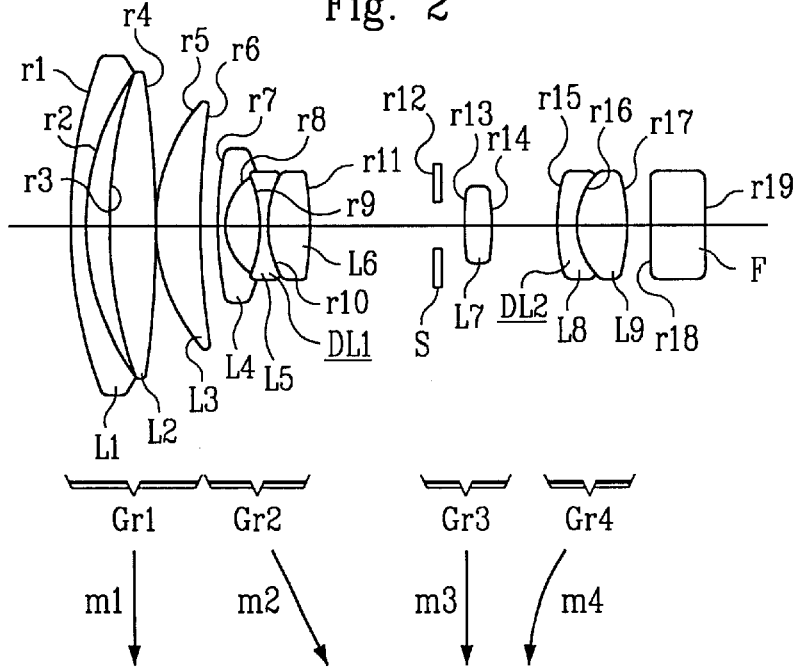
FIG. 2 shows the lens arrangement of Embodiment 2 in the shortest focal length condition when the zoom lens system is in focus regarding an object at infinity.

Embodiments 1 through 4 of the present invention will first be explained. FIGS. 1 through 3 show the lens arrangements in zoom lens systems of the first through fourth embodiments. They are all lens arrangements in the shortest focal length condition (W).

The zoom lens system of each embodiment comprises, from the object side, first lens unit Gr1 having positive optical power, second lens unit Gr2 having negative optical power, third lens unit Gr3 having positive optical power and including aperture s, and fourth lens unit Gr4 having positive optical power. The zoom lens system of each embodiment is a zoom lens system in which first lens unit Gr1 and third lens unit Gr3 are fixed while second lens unit Gr2 and fourth lens unit Gr4 move toward the image to change the magnification during zooming from the shortest focal length condition to the longest focal length condition. Arrows m1 through m4 in FIGS. 1 through 4 respectively show in a simplified manner the movements of first lens unit Gr1 through fourth lens unit Gr4 during zooming from the shortest focal length condition (W) to the longest focal length condition (T).

The zoom lens systems of Embodiments 1 through 3 (see FIGS. 1 through 3) each comprise, from the object side, first lens unit Gr1 comprising a first lens element L1 having a negative meniscus configuration with the convex surface on the object side, second lens element L2 having convex surfaces on both sides and third lens element L3 having a positive meniscus configuration with the convex surface on the object side; second lens unit Gr2 comprising fourth lens element L4 having a negative meniscus configuration with the convex surface on the object side and first combination lens DL1 comprising fifth lens element L5 having concave surfaces on both sides and sixth lens element L6 having convex surfaces on both sides, said fifth and sixth lens elements being glued together; third lens unit Gr3 comprising aperture s and seventh lens element L7 having convex surfaces on both sides; fourth lens unit Gr4 comprising second combination lens DL2 comprising eighth lens element L8 having a negative meniscus configuration with the convex surface on the object side and ninth lens element L9 having convex surfaces on both sides, said eighth and ninth lens elements being glued together; and filter F.

The zoom lens system of Embodiment 4 (see FIG. 4) comprises, from the object side, first lens unit Gr1 comprising first lens element L1 having a negative meniscus configuration with the convex surface on the object side, second lens element L2 having a positive meniscus configuration with the convex surface on the object side and third lens element L3 having a positive meniscus configuration with the convex surface on the object side; second lens unit Gr2 comprising fourth lens element L4 having a negative meniscus configuration with the convex surface on the object side and an aspherical object side surface described below, first combination lens DL1 comprising fifth lens element L5 having concave surfaces on both sides and sixth lens element L6 having convex surfaces on both sides, said fifth and sixth lens elements being glued together; third lens unit Gr3 comprising aperture s and seventh lens element L7 having convex surfaces on both sides; fourth lens unit Gr4 comprising second combination lens DL2 comprising eighth lens element L8 having a negative meniscus configuration with the convex surface on the object side and ninth lens element L9 having convex surfaces on both sides, said eighth and ninth lens elements being glued together; and filter F.

Figure 5A:
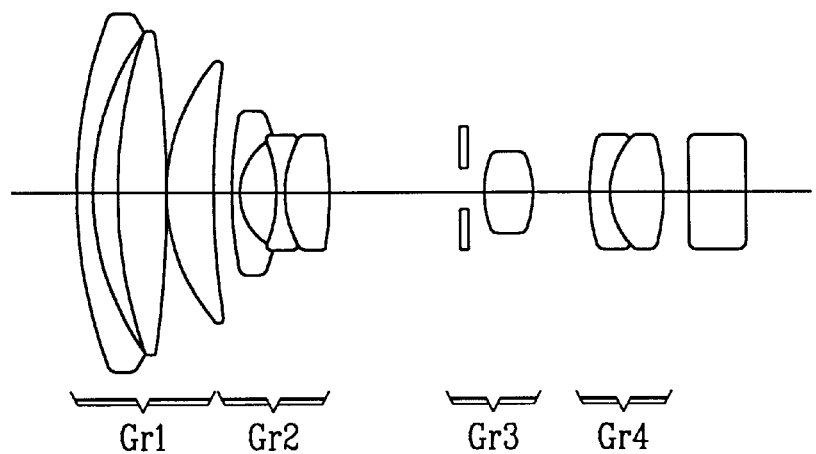
FIG. 5A shows the lens arrangement of Embodiment 5 in the shortest focal length condition when the zoom lens system is in focus regarding an object at a macro-photographic 0.065 m distance.
Figure 5B:
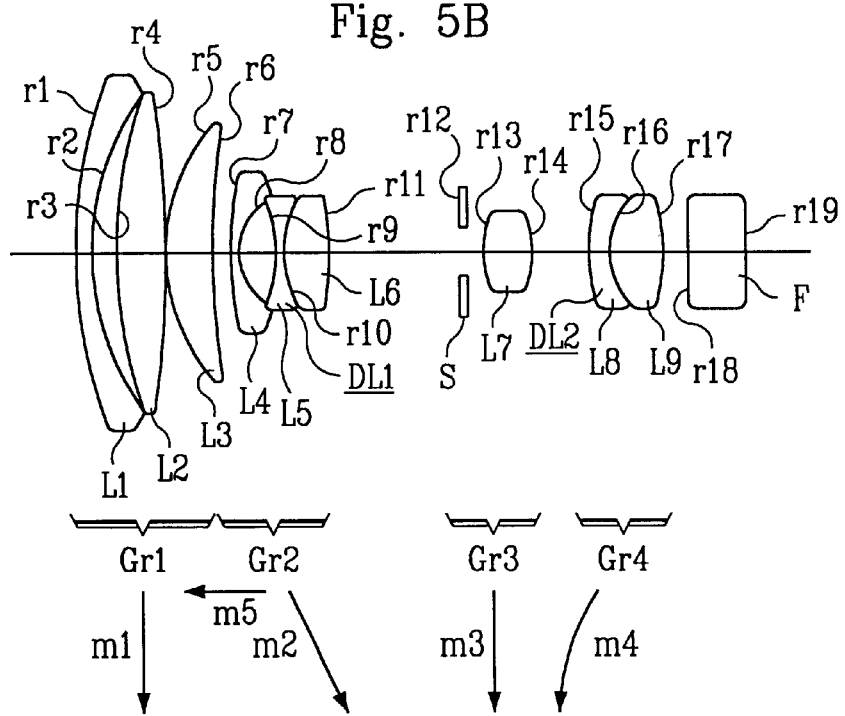
FIG. 5B shows the lens arrangement of Embodiment 5 in the shortest focal length condition when the zoom lens system is in focus regarding an object at a 3 m distance.
Figure 6A:
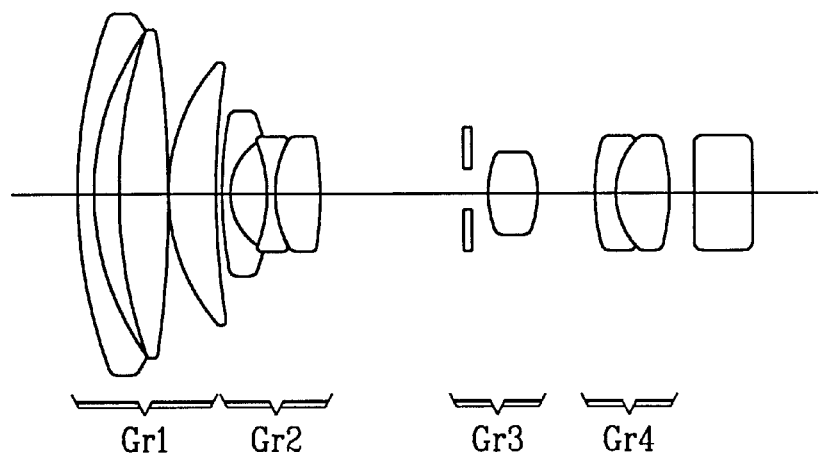
FIG. 6A shows the lens arrangement of Embodiment 6 in the shortest focal length condition when the zoom lens system is in focus regarding an object at a macro-photographic 0.065 m distance.
Figure 6B:
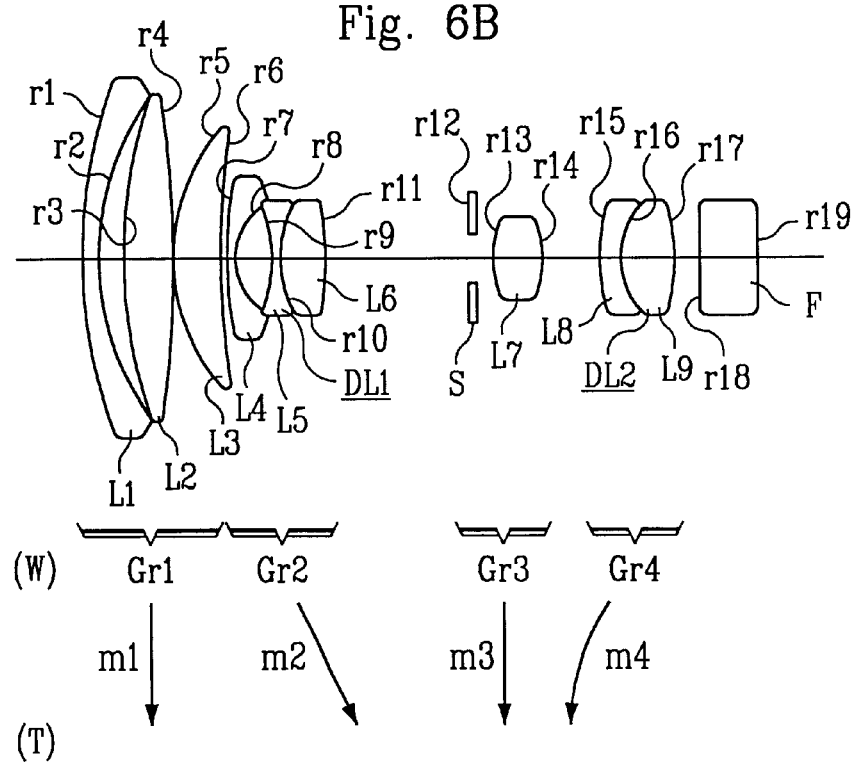
FIG. 6B shows the lens arrangement of Embodiment 6 in the shortest focal length condition when the zoom lens system is in focus regarding an object at a 3 m distance.
Figure 7A:
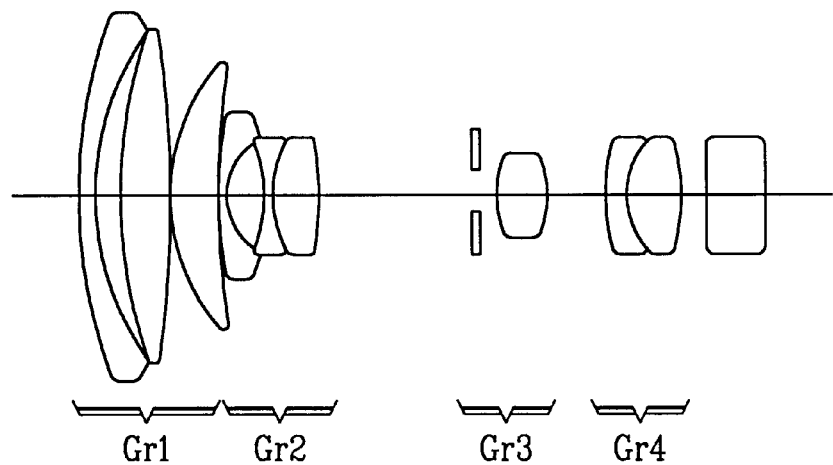
FIG. 7A shows the lens arrangement of Embodiment 7 in the shortest focal length condition when the zoom lens system is in focus regarding an object at a macro-photographic 0.065 m distance.
Figure 7B:
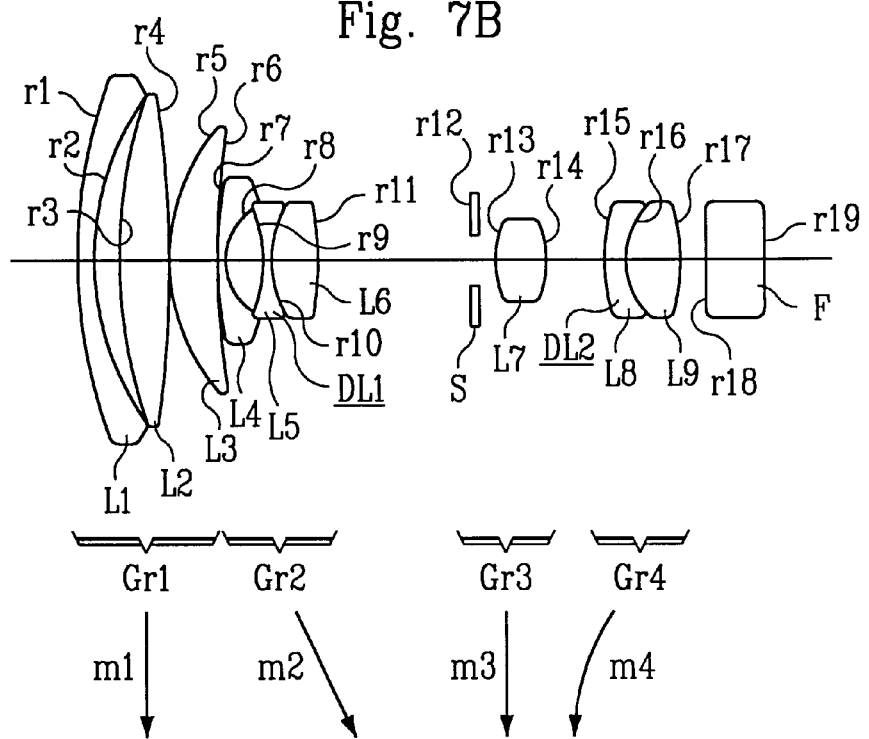
FIG. 7B shows the lens arrangement of Embodiment 7 in the shortest focal length condition when the zoom lens system is in focus regarding an object at a 3 m distance.
Figure 10A:
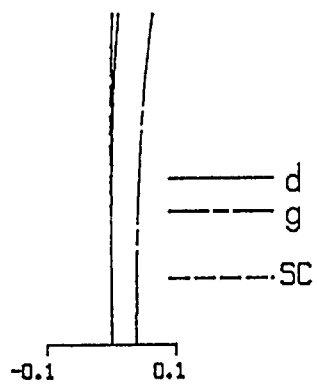
FIGS. 10A through 10C show the aberrations of the zoom lens system pertaining to Embodiment 1 in the longest focal length condition when it is in focus regarding an object at infinity.
Figure 10B:
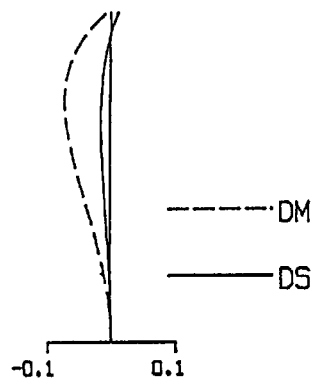
Figure 10C:
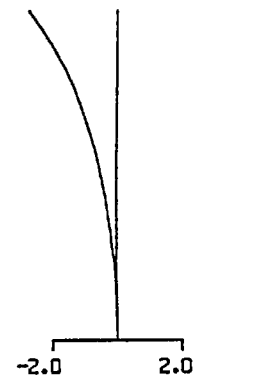
Figure 11A:
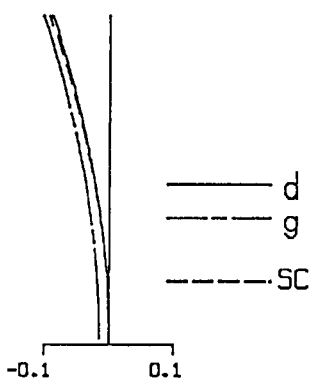
FIGS. 11A through 11C show the aberrations of the zoom lens system pertaining to Embodiment 2 in the shortest focal length condition when it is in focus regarding an object at infinity.
Figure 11B:
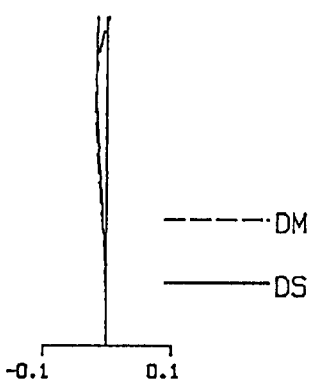
Figure 11C:
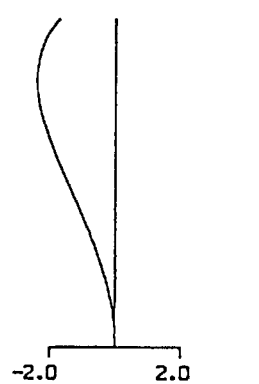
Figure 12A:
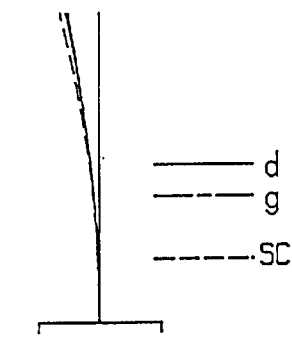
FIGS. 12A through 12C show the aberrations of the zoom lens system pertaining to Embodiment 2 in the middle focal length condition when it is in focus regarding an object at infinity.
Figure 12B:
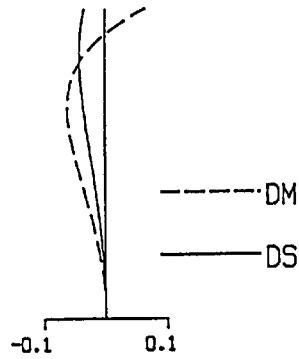
Figure 12C:
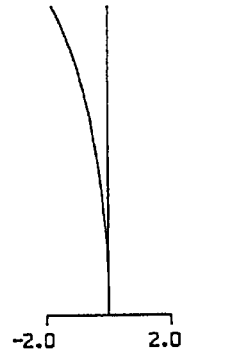
Figure 13A:
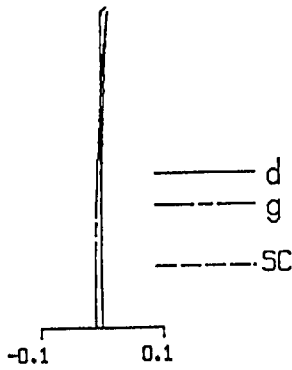
FIGS. 13A through 13C show the aberrations of the zoom lens system pertaining to Embodiment 2 in the longest focal length condition when it is in focus regarding an object at infinity.
Figure 13B:
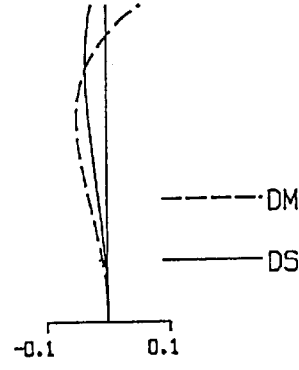
Figure 13C:
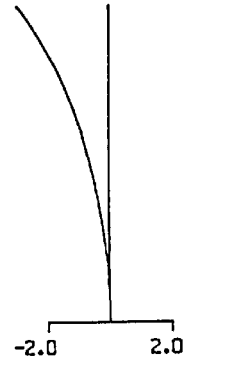
Figure 14A:
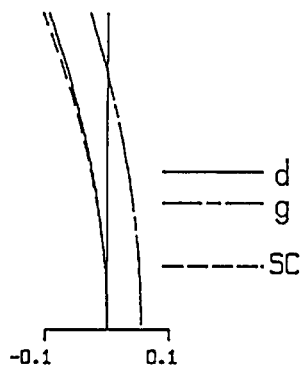
FIGS. 14A through 14C show the aberrations of the zoom lens system pertaining to Embodiment 3 in the shortest focal length condition when it is in focus regarding an object at infinity.
Figure 14B:
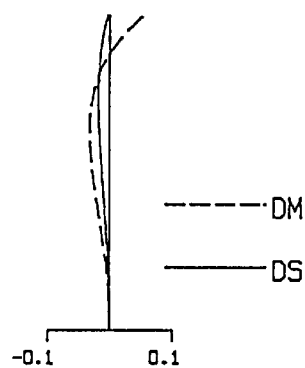
Figure 14C:
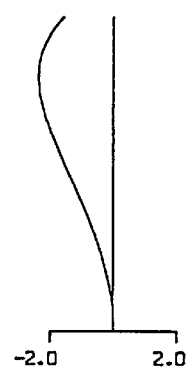
Figure 15A:
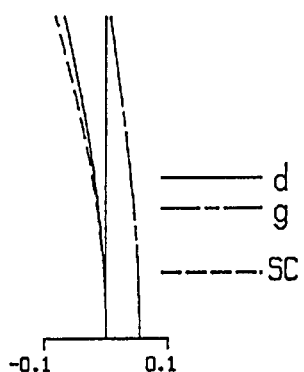
FIGS. 15A through 15C show the aberrations of the zoom lens system pertaining to Embodiment 3 in the middle focal length condition when it is in focus regarding an object at infinity.
Figure 15B:
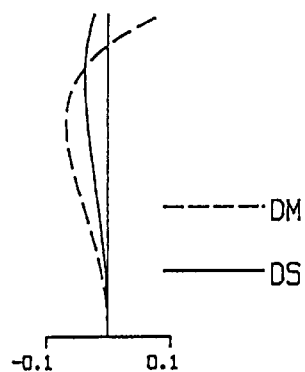
Figure 15C:
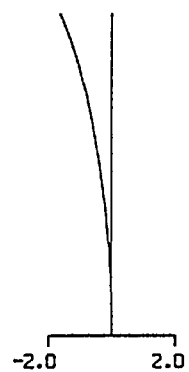
Figure 18A:
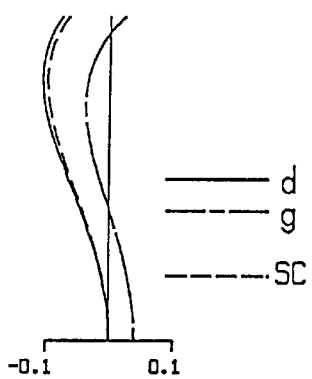
FIGS. 18A through 18C show the aberrations of the zoom lens system pertaining to Embodiment 4 in the middle focal length condition when it is in focus regarding an object at infinity.
Figure 18B:
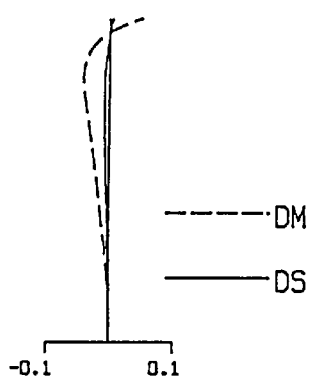
Figure 18C:
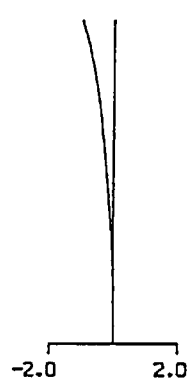
Figure 19A:
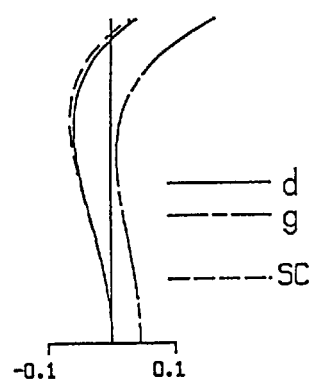
FIGS. 19A through 19C show the aberrations of the zoom lens system pertaining to Embodiment 4 in the longest focal length condition when it is in focus regarding an object at infinity.
Figure 19B:
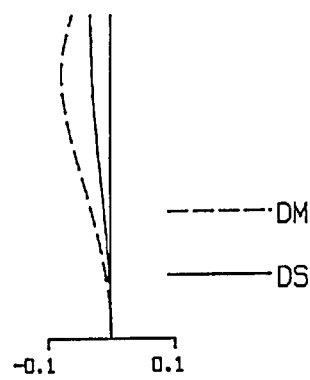
Figure 19C:
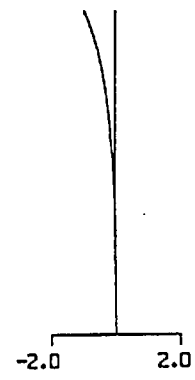
Figure 26A:
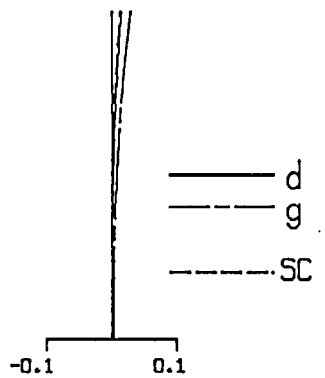
FIGS. 26A through 26C show the aberrations of the zoom lens system pertaining to Embodiment 6 in the longest focal length condition during normal focusing (object distance 7 m).
Figure 26B:
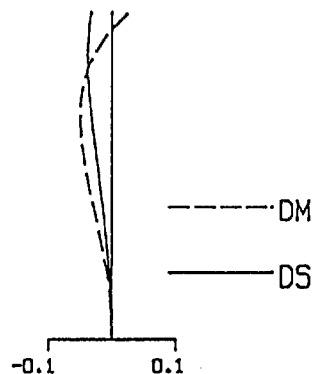
Figure 26C:
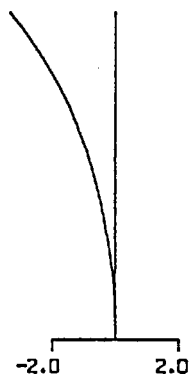
Figure 27A:
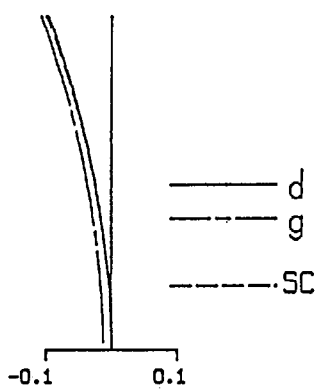
FIGS. 27A through 27C show the aberrations of the zoom lens system pertaining to Embodiment 6 in the shortest focal length condition during macro-focusing (object distance 0.065 m).
Figure 27B:
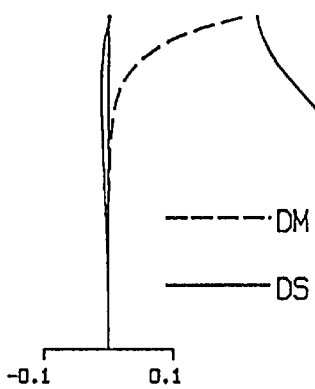
Figure 27C:
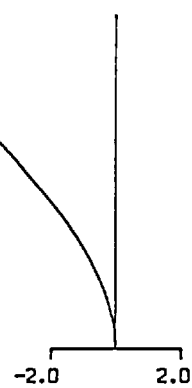
Figure 30A:
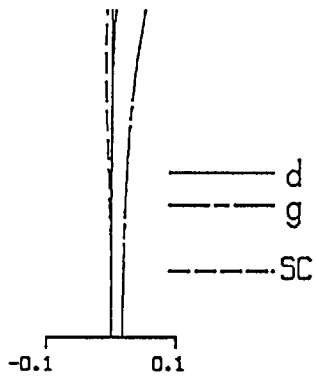
FIGS. 30A through 30C show the aberrations of the zoom lens system pertaining to Embodiment 7 in the longest focal length condition during normal focusing (object distance 7 m).
Figure 30B:
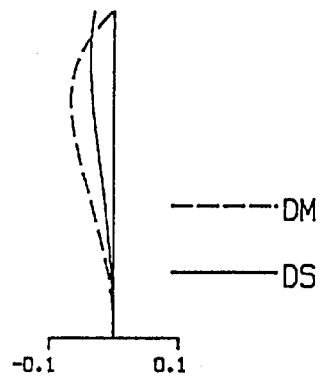
Figure 30C:
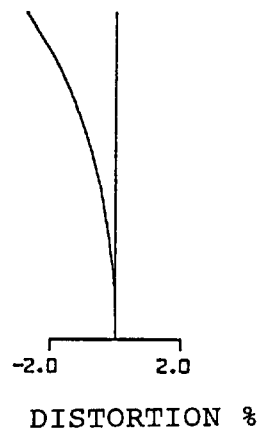
Figure 31A:
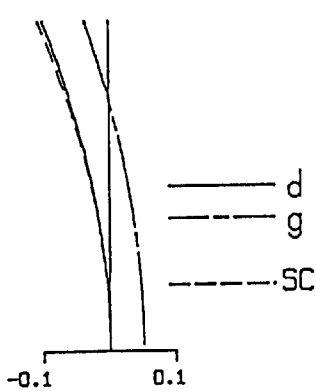
FIGS. 31A through 31C show the aberrations of the zoom lens system pertaining to Embodiment 7 in the shortest focal length condition during macro-focusing (object distance 0.065 m).
Figure 31B:
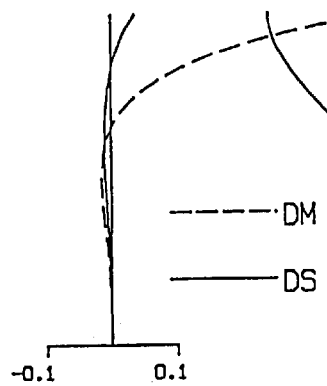
Figure 31C:
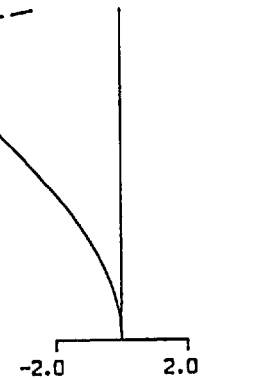

Embodiments 5 through 7 of the present invention are explained below. FIGS. 5A through 7B show the lens arrangements of the zoom lens systems of Embodiments 5 through 7, respectively. FIGS. 5A, 6A and 7A show the lens arrangements when the zoom lens system is in focus regarding an object at a macro-photographic 0.065 m distance and in the shortest focal length condition. FIGS. 5B, 6B and 7B show the lens arrangements when the zoom lens system is in focus regarding an object at a 3 m distance and in the shortest focal length condition.

The zoom lens systems of Embodiments 5 through 7 (see FIGS. 5A through 7B) each comprise, from the object side, first lens unit Gr1 having positive optical power, second lens unit Gr2 having negative optical power, third lens unit Gr3 having positive optical power and including aperture s and fourth lens unit Gr4 having positive optical power. The zoom lens system of each embodiment is a zoom lens system in which first lens unit Gr1 and third lens unit Gr3 are fixed while second lens unit Gr2 and fourth lens unit Gr4 move toward the image to change the magnification during zooming from the shortest focal length condition to the longest focal length condition. Arrows m1 through m4 in FIGS. 5B, 6B, and 7B respectively show in a simplified manner the movements of first lens unit Gr1 through fourth lens unit Gr4 during zooming from the shortest focal length condition (W) to the longest focal length condition (T). Arrow m5 shows the movement of second lens unit Gr2 during macro focusing from the condition in which the zoom lens system is in focus regarding an object at infinity and the lenses are at the shortest focal length positions to a condition in which the zoom lens system is in focus regarding an object at the closest possible distance.

The zoom lens systems of Embodiments 5 through 7 (see FIGS. 5A through 7B) each comprise, from the object side, first lens unit Gr1 comprising first lens element L1 having a negative meniscus configuration with the convex surface on the object side, second lens element L2 having convex surfaces on both sides and third lens element L3 having a positive meniscus configuration with the convex surface on the object side; second lens unit Gr2 comprising fourth lens element L4 having a negative meniscus configuration with the convex surface on the object side and first combination lens DL1 comprising fifth lens element L5 having concave surfaces on both sides and sixth lens element L6 having convex surfaces on both sides, said fifth and sixth lens elements being glued together; third lens unit Gr3 comprising aperture s and seventh lens element L7 having convex surfaces on both sides; fourth lens unit Gr4 comprising second combination lens DL2 comprising eighth lens element L8 having a negative meniscus configuration with the convex surface on the object side and ninth lens element L9 having convex surfaces on both sides, said eighth and ninth lens elements being glued together, and filter F.

As described above, in the zoom lens systems of Embodiments 5 through 7, a construction is employed in which only second lens unit Gr2 is moved during macro-focusing along the optical axis toward the object from the lens arrangement in the shortest focal length condition shown in each of the drawings.

Generally speaking, when macro-focusing is carried out, it is necessary to move one of the lens units comprising the zoom lens system, or part of a lens unit, along the optical axis.

However, in the zoom lens systems of the embodiments, if first lens unit Gr1 or third lens unit Gr3, or part of either of said lens units, were to be moved, it would become necessary to provide the lens barrel with a movement mechanism to move the lens unit that has nothing to do with the change in magnification, which would lead to a complex lens barrel construction and thus an increase in cost. Where the lens arrangements of the zoom lens systems of the embodiments are used, in particular, if first lens unit Gr1 were to be moved for the purpose of focusing, it would become necessary to increase the effective apertures of the lens elements comprising first lens unit Gr1, which would lead to a larger lens system.

On the other hand, in the zoom lens systems of the embodiments, as between second lens unit Gr2 and fourth lens unit Gr4 that move along the optical axis during magnification change, second lens unit Gr2 primarily acts as a variator that contributes to magnification change while fourth lens unit Gr4 acts as a compensator that corrects the position of the image after magnification change. Therefore, while the movement along the optical axis during magnification change regarding second lens unit Gr2 is linear, that regarding fourth lens unit Gr4 is very complex.

Therefore, if fourth lens unit Gr4 were moved along the optical axis during macro-focusing, a lens barrel construction to carry out macro focusing would also become necessary in addition to the lens barrel construction used to carry out the movement to perform magnification change, which would lead to a very complex lens mount construction. If the lens barrel were made complex as described above, a high level of precision would be needed in the processing and assembly of the lens barrel, which would lead to an increase in cost.

In contrast, because second lens unit Gr2 moves in a linear fashion during magnification change, even if a lens barrel construction to carry out the movement during macro-focusing were added, the resulting lens barrel construction would not be as complex as it would be if fourth lens unit Gr4 were moved. Therefore, where second lens unit Gr2 is used for macro-focusing, even if a lens barrel construction to carry out macro-focusing were added to the lens barrel construction used for the purpose of magnification change, a lens barrel construction can be used that is simpler than that employed when fourth lens unit Gr4 is used as the lens unit that moves during macro-focusing.

For the reasons described above, in the zoom lens systems of Embodiments 5 through 7, a construction is employed in which during macro-focusing only second lens unit Gr2 is moved along the optical axis toward the object from the lens arrangement in the shortest focal length condition shown in each of the drawings.

Further, in the zoom lens systems of Embodiments 5 through 7, macro-focusing is carried out with the lens arrangement in the shortest focal length condition as the starting point. By performing macro-focusing in this way, the closest object distance may be further reduced.

In addition, in the zoom lens systems of Embodiments 5 through 7, a pan focus construction is used in which focusing is not carried out by moving the lens units when the object distance changes, but in which the zoom lens system is used after being fixed at a prescribed finite object distance. The zoom lens systems of the embodiments have two fixed object distances for the telephoto range and wide-angle range, respectively. By using the pan focus construction in this way, a moving mechanism including cams and a helicoid to carry out movement for focusing need not be provided when constructing the lens mount of the zoom lens system, and thus the lens mount construction may be made very simple.

Condition (1) that the zoom lens systems of Embodiments 1 through 7 should satisfy will now be explained. To satisfy condition (1) is essential for Embodiments 1 through 4, while it is desirable but not essential for Embodiments 5 through 7.

For a zoom lens system that comprises a first lens unit having positive optical power, a second lens unit having negative optical power, third lens unit having a positive optical power and fourth lens unit having a positive optical power and in which the first lens unit is fixed and the second lens unit moves along the optical axis during zooming, it is desirable to satisfy condition (1) set forth below.

$$1.5 < \left|\frac{f_{1,2}}{f_W}\right| < 1.85 \quad (1)$$

where $f_{1,2}$: combined focal length of the first and second lens units in the shortest focal length condition; and $f_W$: focal length of the entire zoom lens system in the shortest focal length condition.

Condition (1) is a condition to define the combined focal length of the first lens unit and second lens unit in the shortest focal length condition and to further reduce the focal length in the wide-angle range while maintaining compactness in a zoom lens system having the construction described above. If the lower limit of condition (1) is exceeded, the combined focal length of the first lens unit and second lens unit becomes too small, and as a result the optical powers of the third lens unit and fourth lens unit increase relative to the first two lens units. Consequently, the back focus of the zoom lens system increases, which leads to an unacceptable increase in the length of the zoom lens system and thus a large zoom lens system. Conversely, if the upper limit of condition (1) is exceeded, the combined focal length of the first lens unit and second lens unit becomes too large.

Consequently, the illuminance in the peripheral areas decreases in the wide-angle range in particular, which is not desirable. If it is attempted to compensate for this decrease in illuminance in peripheral areas, the diameters of the lens elements comprising the first lens unit increase, which is also not desirable.

Conditions (2) through (5) that the zoom lens systems of the embodiments should satisfy will be explained. For a zoom lens system that satisfies condition (1) shown above, it is desirable to satisfy all of conditions (2) through (5), which are explained below, but it is not necessarily required that all of said conditions be satisfied at the same time-satisfying one of the conditions will bring about a corresponding effect.

For a zoom lens system that comprises a first lens unit having a positive optical power, a second lens unit having a negative optical power, a third lens unit having a positive optical power and a fourth lens unit having a positive optical power and in which the first lens unit is fixed and the second lens unit moves along the optical axis during magnification change, it is desirable to satisfy condition (2) set forth below.

$$0.65 < \left|\frac{f_{1,2}}{f_{3,4}}\right| < 0.95 \quad (2)$$

where $f_{3,4}$: combined focal length of the third lens unit and fourth lens unit in the shortest focal length condition.

Condition (2) is a condition to define the ratio of the combined focal length of the first lens unit and second lens unit to the combined focal length of the third lens unit and fourth lens unit in the shortest focal length condition and to maintain good aberration correction performance using a small number of lens elements in a zoom lens system having the construction described above. If the lower limit of condition (2) is exceeded, the curvature of field tends to tilt toward the negative side in the telephoto range in particular, which is not desirable. Conversely, if the upper limit of condition (2) is exceeded, the curvature of field in the telephoto range tends to tilt toward the positive side and the illuminance in peripheral areas decreases in the wide-angle range. These are both undesirable phenomena. If it is attempted to compensate for this decrease in illuminance in peripheral areas, the diameters of the lens elements comprising the first lens unit will increase, which is also undesirable.

If the numerical range defined by condition (2) is limited to the range shown as condition (3), the effect described above becomes more marked and a zoom lens system with better aberration correction may be obtained.

$$0.70 < \left|\frac{f_{1,2}}{f_{3,4}}\right| < 0.85 \quad (3)$$

For a zoom lens system that comprises a first lens unit having positive optical power, a second lens unit having negative optical power, a third lens unit having positive optical power and a fourth lens unit having positive optical power and in which the first lens unit and third lens unit are fixed and the second lens unit and fourth lens unit move along the optical axis during zooming, it is desirable to satisfy condition (4) set forth below.

$$3.0 < \left|\frac{f_3}{f_w}\right| < 5.0 \quad (4)$$

where $f_3$: focal length of the third lens unit.

Condition (4) is a condition to define the focal length of the third lens unit and to maintain good aberration correcting performance using a small number of lens elements in a zoom lens system having the construction described above. If the lower limit of condition (4) is exceeded, the focal length of the third lens unit becomes too small, and consequently the spherical aberration tilts toward the negative side in the wide-angle range in particular, which is not desirable. Conversely, if the upper limit of condition (4) is exceeded, the focal length of the third lens unit becomes too large, and accordingly the fourth lens unit comes to bear too large a share of optical power and of aberration correction. As a result, it becomes necessary to increase the number of lens elements in the fourth lens unit or the lens elements comprising the fourth lens unit increase in size, either which is undesirable.

For a zoom lens system that comprises a first lens unit having positive optical power, a second lens unit having negative optical power, a third lens unit having positive optical power and a fourth lens unit having positive optical power and in which the first lens unit is fixed while the second lens unit moves along the optical axis during magnification change and the third lens unit comprises one positive lens element, it is desirable to satisfy condition (5) set forth below.

$$-2.0 < \frac{r_b}{r_a} < -0.5 \quad (5)$$

where $r_a$: radius of curvature of the object side surface of the positive lens element of the third lens unit; and $r_b$: radius of curvature of the image side surface of the positive lens element of the third lens unit.

Condition (5) is a condition to define the configuration of the positive lens element that comprises the third lens unit in a zoom lens system having the construction described above. If the lower limit of condition (5) is exceeded, the coma aberration increases in the positive side in the wide-angle range in particular, which is undesirable. Conversely, if the upper limit of condition (5) is exceeded, the spherical aberration tilts toward the negative side in the wide-angle range in particular, which is also undesirable.

Where the third lens unit comprises one positive lens element as in the construction described above, it is desirable to use in the third lens unit an aspherical surface that has a configuration in which the positive optical power decreases as one moves away from the optical axis toward the periphery of the lens. Where it is attempted to obtain a bright zoom lens system by making its F-number small, since the axial and off-axial rays that strike the positive lens element comprising the third lens unit do so at points farther away from the optical axis, these light rays are greatly affected by the configuration of the peripheral areas of this positive lens element. Here, if both surfaces of the positive lens element are spherical, sufficient aberration correction cannot be carried out with regard to the light rays that pass through points in the lens in areas that are peripheral to the optical axis, in particular, and therefore it is difficult to make the F-number of the zoom lens system small. In contrast, if an aspherical surface that has a configuration in which the positive optical power decreases as one moves away from the optical axis toward the periphery of the lens is used in the positive lens element of the third lens unit, aberration correction with regard to the light rays passing through the peripheral areas may be performed sufficiently. Therefore, by using an aspherical surface having the configuration described above in the third lens unit, a bright zoom lens system with good aberration correction may be provided.

The zoom lens systems of the embodiments are shown more specifically below with reference to construction data, aberration diagrams, etc.

In each embodiment, ri (i=1, 2, 3, . . . ) represents the radius of curvature of the ith lens surface from the object side; di (i=1, 2, 3, . . . ) represents the ith axial distance from the object side; and Ni (i=1, 2, 3, . . .) and vi (i=1, 2, 3, . . . ) represent the refractive index and the Abbe number with regard to the d-line of the ith lens element from the object side, respectively.

In Embodiments 1 through 4, with regard to focal length f of the entire zoom lens system and the distance between first lens unit Gr1 and second lens unit Gr2, the distance between second lens unit Gr2 and third lens unit Gr3, the distance between third lens unit Gr3 and fourth lens unit Gr4 and the distance between fourth lens unit Gr4 and filter F (axial distances d6, d11, d14 and d17), the values shown correspond to, from the left, the situation in which the zoom lens system is in focus regarding an object at infinity and in the shortest focal length condition (W), in the middle focal length condition (M) and in the longest focal length condition (T), respectively.

In Embodiments 5 through 7, with regard to focal length f of the entire zoom lens system and the distance between first lens unit Gr1 and second lens unit Gr2, the distance between second lens unit Gr2 and third lens unit Gr3, the distance between third lens unit Gr3 and fourth lens unit Gr4 and the distance between fourth lens unit Gr4 and filter F (axial distances d6, d11, d14 and d17), the values shown correspond to, from the left, the situation in which the zoom lens system is in focus regarding an object at a 3 m distance and in the shortest focal length condition (W), the situation in which the zoom lens system is in focus regarding an object at a 3 m distance and in the middle focal length condition (M), and the situation in which the zoom lens system is in focus regarding an object at a 7 m distance and in the longest focal length condition (T), respectively. The values for macro-photography are shown as values for when the object distance is 0.065 m.

The object side surface of seventh lens element L7 of third lens unit Gr3 of Embodiment 4 (the surface indicated by an asterisk) is aspherical, and is defined by the following equation that expresses the configuration of this aspherical surface.

$$x(y) = \frac{C \cdot y^2}{1 + \sqrt{1 - \varepsilon \cdot C^2 \cdot y^2}} + \sum_{i \geq 2} A_i \cdot y^i$$

Where,
- x: height in a direction vertical to the optical axis;
- y: amount of displacement from the reference spherical surface along the optical axis;
- C: paraxial curvature;
- ε: quadratic surface parameter; and
- Ai: ith aspherical coefficient.

TABLE 1

Embodiment 1
f = 4.8 to 8.9 to 13.0   FNO. = 5.0

| | Radius of Curvature | | Axial Distance | | Refractive Index | | Abbe number |
|---|---|---|---|---|---|---|---|
| r1 | 38.719 | | | | | | |
| | | d1 | 0.993 | N1 | 1.81263 | ν 1 | 25.46 |
| r2 | 18.599 | | | | | | |
| | | d2 | 1.850 | | | | |
| r3 | 42.012 | | | | | | |
| | | d3 | 3.299 | N2 | 1.62555 | ν 2 | 58.12 |
| r4 | −66.360 | | | | | | |
| | | d4 | 0.200 | | | | |
| r5 | 15.036 | | | | | | |
| | | d5 | 2.890 | N3 | 1.77621 | ν 3 | 49.62 |
| r6 | 50.573 | | | | | | |
| | | d6 | 1.502 to 5.956 to 8.159 | | | | |
| r7 | 53.294 | | | | | | |
| | | d7 | 0.719 | N4 | 1.83930 | ν 4 | 37.34 |
| r8 | 4.660 | | | | | | |
| | | d8 | 2.358 | | | | |
| r9 | −11.890 | | | | | | |
| | | d9 | 0.733 | N5 | 1.69975 | ν 5 | 56.47 |
| r10 | 8.970 | | | | | | |
| | | d10 | 2.499 | N6 | 1.85505 | ν 6 | 23.78 |
| r11 | −128.575 | | | | | | |
| | | d11 | 9.344 to 4.890 to 2.687 | | | | |
| r12 | ∞ | | | | | | |
| | | d12 | 1.680 | | | | |
| r13 | 22.613 | | | | | | |
| | | d13 | 2.124 | N7 | 1.74794 | ν 7 | 44.90 |
| r14 | −21.664 | | | | | | |
| | | d14 | 4.506 to 2.270 to 0.830 | | | | |
| r15 | 12.175 | | | | | | |
| | | d15 | 1.112 | N8 | 1.85505 | ν 8 | 23.78 |
| r16 | 5.030 | | | | | | |
| | | d16 | 3.651 | N7 | 1.62555 | ν 9 | 58.12 |
| r17 | −18.086 | | | | | | |
| | | d17 | 1.000 to 3.236 to 4.676 | | | | |
| r18 | ∞ | | | | | | |
| | | d18 | 4.210 | N10 | 1.51872 | ν 10 | 64.20 |
| r19 | ∞ | | | | | | |

TABLE 2

Embodiment 2
f = 4.8 to 8.9 to 13.0   FNO. = 5.0

| | Radius of Curvature | | Axial Distance | | Refractive Index | | Abbe number |
|---|---|---|---|---|---|---|---|
| r1 | 38.156 | | | | | | |
| | | d1 | 0.991 | N1 | 1.81263 | ν 1 | 25.46 |
| r2 | 19.061 | | | | | | |
| | | d2 | 1.843 | | | | |
| r3 | 45.212 | | | | | | |
| | | d3 | 3.293 | N2 | 1.62555 | ν 2 | 58.12 |
| r4 | −72.972 | | | | | | |
| | | d4 | 0.200 | | | | |

TABLE 2-continued

Embodiment 2
f = 4.8 to 8.9 to 13.0   FNO. = 5.0

| | Radius of Curvature | | Axial Distance | | Refractive Index | | Abbe number |
|---|---|---|---|---|---|---|---|
| r5 | 16.270 | | | | | | |
| | | d5 | 2.879 | N3 | 1.77621 | ν 3 | 49.62 |
| r6 | 48.450 | | | | | | |
| | | d6 | 1.491 to 6.776 to 9.429 | | | | |
| r7 | 33.344 | | | | | | |
| | | d7 | 0.711 | N4 | 1.83930 | ν 4 | 37.34 |
| r8 | 4.743 | | | | | | |
| | | d8 | 2.339 | | | | |
| r9 | −12.099 | | | | | | |
| | | d9 | 0.722 | N5 | 1.71615 | ν 5 | 53.94 |
| r10 | 9.023 | | | | | | |
| | | d10 | 2.490 | N6 | 1.85505 | ν 6 | 23.78 |
| r11 | −37.107 | | | | | | |
| | | d11 | 9.341 to 4.056 to 1.403 | | | | |
| r12 | ∞ | | | | | | |
| | | d12 | 1.680 | | | | |
| r13 | 22.381 | | | | | | |
| | | d13 | 2.118 | N7 | 1.71615 | ν 7 | 53.94 |
| r14 | −20.903 | | | | | | |
| | | d14 | 4.506 to 2.696 to 1.544 | | | | |
| r15 | 11.707 | | | | | | |
| | | d15 | 1.099 | N8 | 1.85505 | ν 8 | 23.78 |
| r16 | 4.936 | | | | | | |
| | | d16 | 3.646 | N7 | 1.62555 | ν 9 | 58.12 |
| r17 | −15.735 | | | | | | |
| | | d17 | 1.000 to 2.810 to 3.961 | | | | |
| r18 | ∞ | | | | | | |
| | | d18 | 4.210 | N10 | 1.51872 | ν 10 | 64.20 |
| r19 | ∞ | | | | | | |

TABLE 3

Embodiment 3
f = 4.8 to 8.9 to 13.0   FNO. = 5.0

| | Radius of Curvature | | Axial Distance | | Refractive Index | | Abbe number |
|---|---|---|---|---|---|---|---|
| r1 | 42.379 | | | | | | |
| | | d1 | 0.974 | N1 | 1.81263 | ν 1 | 25.46 |
| r2 | 18.742 | | | | | | |
| | | d2 | 1.841 | | | | |
| r3 | 45.699 | | | | | | |
| | | d3 | 3.285 | N2 | 1.62555 | ν 2 | 58.12 |
| r4 | −59.599 | | | | | | |
| | | d4 | 0.200 | | | | |
| r5 | 16.723 | | | | | | |
| | | d5 | 2.856 | N3 | 1.77621 | ν 3 | 49.62 |
| r6 | 52.095 | | | | | | |
| | | d6 | 1.462 to 6.682 to 9.239 | | | | |
| r7 | 31.910 | | | | | | |
| | | d7 | 0.689 | N4 | 1.83930 | ν 4 | 37.34 |
| r8 | 4.831 | | | | | | |
| | | d8 | 2.341 | | | | |
| r9 | −11.559 | | | | | | |
| | | d9 | 0.731 | N5 | 1.71615 | ν 5 | 53.94 |
| r10 | 8.628 | | | | | | |
| | | d10 | 2.490 | N6 | 1.85505 | ν 6 | 23.78 |
| r11 | −35.127 | | | | | | |
| | | d11 | 9.322 to 4.102 to 1.545 | | | | |
| r12 | ∞ | | | | | | |
| | | d12 | 1.680 | | | | |
| r13 | 31.521 | | | | | | |
| | | d13 | 2.107 | N7 | 1.71615 | ν 7 | 53.94 |
| r14 | −37.070 | | | | | | |
| | | d14 | 4.506 to 2.710 to 1.398 | | | | |
| r15 | 11.001 | | | | | | |
| | | d15 | 1.105 | N8 | 1.85505 | ν 8 | 23.78 |
| r16 | 4.875 | | | | | | |
| | | d16 | 3.638 | N7 | 1.62555 | ν 9 | 58.12 |

TABLE 3-continued

Embodiment 3
f = 4.8 to 8.9 to 13.0   FNO. = 5.0

| Radius of Curvature | | Axial Distance | Refractive Index | | Abbe number |
|---|---|---|---|---|---|
| r17 −12.496 | | | | | |
| | d17 | 1.000 to 2.796 to 4.108 | | | |
| r18 ∞ | | | | | |
| | d18 | 4.210 | N10 | 1.51872 | ν 10 | 64.20 |
| r19 ∞ | | | | | |

TABLE 4

Embodiment 4
f = 4.4 to 8.4 to 12.6   FNO. = 2.2

| Radius of Curvature | | Axial Distance | Refractive Index | | Abbe number |
|---|---|---|---|---|---|
| r1 36.000 | | | | | |
| | d1 | 1.100 | N1 | 1.81263 | ν 1 | 25.46 |
| r2 19.396 | | | | | |
| | d2 | 0.720 | | | |
| r3 22.700 | | | | | |
| | d3 | 4.810 | N2 | 1.62555 | ν 2 | 58.12 |
| r4 758.001 | | | | | |
| | d4 | 0.200 | | | |
| r5 20.500 | | | | | |
| | d5 | 3.130 | N3 | 1.77621 | ν 3 | 49.62 |
| r6 74.000 | | | | | |
| | d6 | 0.744 to 6.119 to 8.642 | | | |
| r7 37.600 | | | | | |
| | d7 | 0.780 | N4 | 1.81081 | ν 4 | 40.73 |
| r8 4.880 | | | | | |
| | d8 | 2.670 | | | |
| r9 −7.260 | | | | | |
| | d9 | 0.770 | N5 | 1.69980 | ν 5 | 55.46 |
| r10 10.250 | | | | | |
| | d10 | 1.950 | N6 | 1.85505 | ν 6 | 23.78 |
| r11 −28.790 | | | | | |
| | d11 | 9.561 to 4.186 to 1.663 | | | |
| r12 ∞ | | | | | |
| | d12 | 1.680 | | | |
| r13* 13.000 | | | | | |
| | d13 | 2.320 | N7 | 1.59142 | ν 7 | 61.25 |
| r14 −22.444 | | | | | |
| | d14 | 5.387 to 3.034 to 1.442 | | | |
| r15 14.860 | | | | | |
| | d15 | 0.780 | N8 | 1.85505 | ν 8 | 23.78 |
| r16 4.900 | | | | | |
| | d16 | 3.800 | N7 | 1.66152 | ν 9 | 50.85 |
| r17 −12.890 | | | | | |
| | d17 | 3.000 to 5.350 to 6.940 | | | |
| r18 ∞ | | | | | |
| | d18 | 4.000 | N10 | 1.51872 | ν 10 | 64.20 |
| r19 ∞ | | | | | |

Aspherical Coefficient
r13

$\epsilon = 1.00000$
$A_4 = -0.16200 \times 10^{-3}$
$A_6 = -0.83500 \times 10^{-6}$
$A_8 = 0.23400 \times 10^{-6}$

TABLE 5

Embodiment 5
f = 4.8 to 8.9 to 13.0   FNO. = 5.3

| Radius of Curvature | | Axial Distance | Refractive Index | | Abbe number |
|---|---|---|---|---|---|
| r1 38.284 | | | | | |
| | d1 | 0.991 | N1 | 1.81263 | ν 1 | 25.46 |
| r2 18.467 | | | | | |
| | d2 | 1.849 | | | |
| r3 41.628 | | | | | |
| | d3 | 3.298 | N2 | 1.62555 | ν 2 | 58.12 |
| r4 −64.171 | | | | | |
| | d4 | 0.200 | | | |
| r5 14.884 | | | | | |
| | d5 | 2.889 | N3 | 1.77621 | ν 3 | 49.62 |
| r6 49.574 | | | | | |
| | d6 | 1.501 to 5.955 to 8.169 | | | |
| r7 56.945 | | | | | |
| | d7 | 0.718 | N4 | 1.83930 | ν 4 | 37.34 |
| r8 4.646 | | | | | |
| | d8 | 2.361 | | | |
| r9 −11.770 | | | | | |
| | d9 | 0.733 | N5 | 1.69975 | ν 5 | 56.47 |
| r10 8.889 | | | | | |
| | d10 | 2.497 | N6 | 1.85505 | ν 6 | 23.78 |
| r11 −105.857 | | | | | |
| | d11 | 9.342 to 4.884 to 2.674 | | | |
| r12 ∞ | | | | | |
| | d12 | 1.680 | | | |
| r13 22.418 | | | | | |
| | d13 | 2.125 | N7 | 1.74794 | ν 7 | 44.90 |
| r14 −21.124 | | | | | |
| | d14 | 4.497 to 2.229 to 0.800 | | | |
| r15 12.302 | | | | | |
| | d15 | 1.116 | N8 | 1.85505 | ν 8 | 23.78 |
| r16 5.039 | | | | | |
| | d16 | 3.651 | N7 | 1.62555 | ν 9 | 58.12 |
| r17 −18.440 | | | | | |
| | d17 | 1.009 to 3.277 to 4.706 | | | |
| r18 ∞ | | | | | |
| | d18 | 4.210 | N10 | 1.51872 | ν 10 | 64.20 |
| r19 ∞ | | | | | |

Axial Distance During The Macro-Focusing (object distance 0.065 m) In The Shortest Focal Distance Condition

| | |
|---|---|
| d6 | 0.745 |
| d11 | 10.098 |
| d14 | 4.497 |
| d17 | 1.009 |

TABLE 6

Embodiment 6
f = 4.8 to 8.9 to 13.0   FNO. = 4.8

| Radius of Curvature | | Axial Distance | Refractive Index | | Abbe number |
|---|---|---|---|---|---|
| r1 38.817 | | | | | |
| | d1 | 0.984 | N1 | 1.81263 | ν 1 | 25.46 |
| r2 18.976 | | | | | |
| | d2 | 1.837 | | | |
| r3 45.334 | | | | | |
| | d3 | 3.287 | N2 | 1.62555 | ν 2 | 58.12 |
| r4 −72.027 | | | | | |
| | d4 | 0.200 | | | |
| r5 16.246 | | | | | |
| | d5 | 2.875 | N3 | 1.77621 | ν 3 | 49.62 |
| r6 49.610 | | | | | |
| | d6 | 1.487 to 6.919 to 9.618 | | | |
| r7 29.410 | | | | | |
| | d7 | 0.709 | N4 | 1.83930 | ν 4 | 37.34 |
| r8 4.787 | | | | | |
| | d8 | 2.332 | | | |
| r9 −11.969 | | | | | |
| | d9 | 0.714 | N5 | 1.71615 | ν 5 | 53.94 |
| r10 8.904 | | | | | |
| | d10 | 2.480 | N6 | 1.85505 | ν 6 | 23.78 |
| r11 −39.023 | | | | | |

TABLE 6-continued

Embodiment 6
f = 4.8 to 8.9 to 13.0    FNO. = 4.8

|  | | | | | |
|---|---|---|---|---|---|
| r12 ∞ | d11 | 9.339 to 3.906 to 1.207 | | | |
|  | d12 | 1.680 | | | |
| r13 22.123 | | | | | |
|  | d13 | 2.117 | N7 | 1.71615 ν 7 | 53.94 |
| r14 −20.195 | | | | | |
|  | d14 | 4.497 to 2.545 to 1.268 | | | |
| r15 11.861 | | | | | |
|  | d15 | 1.100 | N8 | 1.85505 ν 8 | 23.78 |
| r16 4.902 | | | | | |
|  | d16 | 3.642 | N7 | 1.62555 ν 9 | 58.12 |
| r17 −15.591 | | | | | |
|  | d17 | 1.009 to 2.545 to 4.238 | | | |
| r18 ∞ | | | | | |
|  | d18 | 4.210 | N10 | 1.51872 ν 10 | 64.20 |
| r19 ∞ | | | | | |

Axial Distance During The Macro-Focusing (object distance 0.065 m) In The Shortest Focal Distance Condition

| d6 | 0.333 |
|---|---|
| d11 | 10.493 |
| d14 | 4.497 |
| d17 | 1.009 |

TABLE 7

Embodiment 7
f = 4.8 to 8.9 to 13.0    FNO. = 4.9

| Radius of Curvature | Axial Distance | | Refractive Index | | Abbe number |
|---|---|---|---|---|---|
| r1 42.770 | | | | | |
|  | d1 | 0.966 | N1 | 1.81263 ν 1 | 25.46 |
| r2 18.647 | | | | | |
|  | d2 | 1.837 | | | |
| r3 45.315 | | | | | |
|  | d3 | 3.279 | N2 | 1.62555 ν 2 | 58.12 |
| r4 −55.459 | | | | | |
|  | d4 | 0.200 | | | |
| r5 16.936 | | | | | |
|  | d5 | 2.847 | N3 | 1.77621 ν 3 | 49.62 |
| r6 47.878 | | | | | |
|  | d6 | 1.454 to 6.885 to 9.510 | | | |
| r7 30.068 | | | | | |
|  | d7 | 0.682 | N4 | 1.83930 ν 4 | 37.34 |
| r8 4.870 | | | | | |
|  | d8 | 2.345 | | | |
| r9 −11.364 | | | | | |
|  | d9 | 0.733 | N5 | 1.71615 ν 5 | 53.94 |
| r10 8.444 | | | | | |
|  | d10 | 2.486 | N6 | 1.85505 ν 6 | 23.78 |
| r11 −32.460 | | | | | |
|  | d11 | 9.310 to 3.879 to 1.254 | | | |
| r12 ∞ | | | | | |
|  | d12 | 1.680 | | | |
| r13 34.147 | | | | | |
|  | d13 | 2.100 | N7 | 1.71615 ν 7 | 53.94 |
| r14 −33.992 | | | | | |
|  | d14 | 4.498 to 2.608 to 1.159 | | | |
| r15 11.089 | | | | | |
|  | d15 | 1.107 | N8 | 1.85505 ν 8 | 23.78 |
| r16 4.889 | | | | | |
|  | d16 | 3.634 | N7 | 1.62555 ν 9 | 58.12 |
| r17 −12.453 | | | | | |
|  | d17 | 1.008 to | | 2.608 to | 4.347 |
| r18 ∞ | | | | | |
|  | d18 | 4.210 | N10 | 1.51872 ν 10 | 64.20 |
| r19 ∞ | | | | | |

TABLE 7-continued

Embodiment 7
f = 4.8 to 8.9 to 13.0    FNO. = 4.9

Axial Distance During The Macro-Focusing (object distance 0.065 m) In The Shortest Focal Distance Condition

| d6 | 0.239 |
|---|---|
| d11 | 10.525 |
| d14 | 4.498 |
| d17 | 1.008 |

In the zoom lens systems of Embodiment 1 through 3, the focal length in the shortest focal length condition is 4.8 mm. In the zoom lens system of Embodiment 4, the focal length in the shortest focal length condition is 4.4 mm. These correspond to a 32 mm focal length and a 34 mm focal length, respectively, if converted into a camera that uses 35 mm film. From this, it can be seen that a sufficient wide-angle range is achieved.

The object side surface of seventh lens element L7 of third lens unit Gr3 of Embodiment 4, said surface being defined by the equation that expresses an aspherical surface (r13 or the surface indicated by an asterisk in the radius of curvature column) is an aspherical surface having a configuration in which the positive optical power decreases as one moves away from the optical axis toward the periphery of the lens.

FIGS. 8A through 19C are aberration diagrams corresponding to Embodiments 1 through 4. In each diagram, the aberrations are indicated when the zoom lens system is in focus regarding an object at infinity and in the shortest, middle or longest focal length conditions.

FIGS. 20A through 31C are aberration diagrams corresponding to Embodiments 5 through 7. FIGS. 20A through 22C, 24A through 26C and 28A through 30C are aberration diagrams regarding Embodiments 5 through 7 when the zoom lens system is performing normal focusing. FIGS. 20A through 20C, FIGS. 24A through 24C and FIGS. 28A through 28C indicate the aberrations when the zoom lens system is in focus regarding an object at a 3 m distance and in the shortest focal length condition. FIGS. 21A through 21C, FIGS. 25A through 25C and FIGS. 29A through 29C indicate the aberrations when the zoom lens system is in focus regarding an object at a 3 m distance and in the middle focal length condition. FIGS. 22A through 22C, FIGS. 26A through 26C and FIGS. 30A through 30C indicate the aberrations when the zoom lens system is in focus regarding an object at a 7 m distance and in the longest focal length condition. FIGS. 23A through 23C, 27A through 27C and 31A through 31C are aberration diagrams regarding Embodiments 5 through 7 when the zoom lens system is in focus regarding an object at a 0.065 m distance during macro-focusing.

In each spherical aberration diagram, solid line (d), dotted line (c) and chain line (g) indicate the spherical aberration with regard to the d-line, c-line and g-line, respectively. In the astigmatism diagrams, solid lines Y and X indicate the astigmatism on the meridional surface and that on the sagittal surface, respectively.

Embodiments 1 through 4 satisfy conditions (1) through (5) shown above. The table below shows the values for Embodiments 1 through 4 that correspond to conditions (1) through (5) shown above.

TABLE 8

|  | EMB. 1 | EMB. 2 | EMB. 4 | EMB. 5 |
|---|---|---|---|---|
| $|f_{1,2}/f_W|$ | 1.533 | 1.848 | 1.834 | 1.708 |
| $|f_{1,2}/f_{3,4}|$ | 0.737 | 0.911 | 0.860 | 0.756 |
| $|f_3/f_W|$ | 3.125 | 3.187 | 4.986 | 3.221 |
| $\gamma_b/\gamma_a$ | −0.958 | −0.934 | −1.176 | −1.726 |

Embodiments 5 through 7 satisfy conditions (1) through (4) shown above. The table below shows the values for Embodiments 5 through 7 that correspond to conditions (1) through (4) shown above.

TABLE 9

|  | EMB. 5 | EMB. 6 | EMB. 7 |
|---|---|---|---|
| $|f_{1,2}/f_W|$ | 1.533 | 1.848 | 1.858 |
| $|f_{1,2}/f_{3,4}|$ | 0.738 | 0.914 | 0.871 |
| $|f_3/f_W|$ | 3.125 | 3.187 | 4.986 |

As is obvious from Embodiments 1 through 7 explained above, using the present invention, a zoom lens system that has a short wide-angle focal length as well as good aberration correction may be provided.

As is also obvious from Embodiments 5 through 7 explained above, using the present invention, a zoom lens system that has a simple construction capable of macro-photography and that can be manufactured at low cost may be provided.

Therefore, where the zoom lens system of the present invention is employed as the photo-taking optical system in a digital camera or lens shutter camera, it contributes to allowing these cameras to offer superior performance at lower cost.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A zoom lens system capable of performing macro-photography, the system comprising, in the order from an object side:
    a first lens unit that has positive optical power and is fixed during zooming;
    a second lens unit that has negative optical power and is movable along an optical axis of the system during zooming;
    a third lens unit that has positive optical power and is fixed during zooming; and
    a fourth lens unit that has positive optical power and is movable along the optical axis during zooming,
    wherein said second lens unit is movable along the optical axis toward the object side for macro-focusing,
    wherein the following condition is fullfilled:

$$1.5 < \left|\frac{f_{1,2}}{f_W}\right| < 1.85$$

where
    $f_{1,2}$: combined focal length of the first and second lens units in the shortest focal length condition;
    $f_W$: focal length of the entire zoom lens system in the shortest focal length condition.

2. A zoom lens system as claimed in claim 1, wherein said zoom lens system assumes a fixed focusing position for a prescribed finite object distance during normal focusing.

3. A zoom lens system capable of performing macro-photography, the system comprising, in the order from an object side:
    a first lens unit that has positive optical power and is fixed during zooming;
    a second lens unit that has negative optical power and is movable along an optical axis of the system during zooming;
    a third lens unit that has positive optical power and is fixed during zooming; and
    a fourth lens unit that has positive optical power and is movable along the optical axis during zooming,
    wherein said second lens unit is movable along the optical axis toward the object side for macro-focusing,
    wherein the following condition is fulfilled:

$$0.65 < \left|\frac{f_{1,2}}{f_{3,4}}\right| < 0.95$$

where
    $f_{1,2}$: combined focal length of the first and second lens units in the shortest focal length condition; and
    $f_{3,4}$: combined focal length of the third lens unit and fourth lens unit in the shortest focal length condition.

4. A zoom lesn system as claimed in claim 3, wherein the following condition is fulfilled:

$$0.70 < \left|\frac{f_{1,2}}{f_{3,4}}\right| < 0.85.$$

5. A zoom lens system capable of performing macro-photography, the system comprising, in the order from an object side:
    a first lens unit that has positive optical power and is fixed during zooming;
    a second lens unit that has negative optical power and is movable along an optical axis of the system during zooming;
    a third lens unit that has positive optical power and is fixed during zooming; and
    a fourth lens unit that has positive optical power and is movable along the optical axis during zooming,
    wherein said second lens unit is movable along the optical axis toward the object side for macro-focusing,
    wherein the following condition is fulfilled:

$$3.0 < \left|\frac{f_3}{f_W}\right| < 5.0$$

where
    $f_3$: focal length of the third lens unit; and
    $f_W$: focal length of the entire zoom lens system in the shortest focal length condition.

6. A zoom lens system capable of performing macro-photography, the system comprising, in the order from an object side:
    a first lens unit that has positive optical power and is fixed during zooming;
    a second lens unit that has negative optical power and is movable along an optical axis of the system during zooming, said second lens unit being provided at an image side of said first lens unit via an air gap;

a third lens unit that has positive optical power and is fixed during zooming; and a fourth lens unit that has positive optical power and is movable along the optical axis during zooming, wherein the system assumes a fixed focusing position corresponding to a finite object distance during zooming except for macro-photography;

wherein said second lens unit is movable along the optical axis toward the object side for an object having an object distance less than the fixed focusing position to thereby perform macro-photography.

7. A zoom lens system as claimed in claim 6, wherein the following condition is fulfilled:

$$1.5 < \left|\frac{f_{1,2}}{f_w}\right| < 1.85$$

where $f_{1,2}$: combined focal length of the first and second lens units in the shortest focal length condition; and $f_w$: focal length of the entire zoom lens system in the shortest focal length condition.

8. A zoom lens system as claimed in claim 6, wherein the following condition is fulfilled:

$$0.65 < \left|\frac{f_{1,2}}{f_{3,4}}\right| < 0.95$$

where $f_{1,2}$: combined focal length of the first and second lens units in the shortest focal length condition; and $f_{3,4}$: combined focal length of the third lens unit and fourth lens unit in the shortest focal length condition.

9. A zoom lens system capable of performing macro-photography, the system comprising, in the order from an object side:

a first lens unit that has positive optical power and is fixed during zooming;

a second lens unit that has negative optical power and is movable along an optical axis of the system during zooming;

a third lens unit that has positive optical power;

a compensating unit to correct an image position after image magnification chance during zooming, wherein said second lens unit is moveable along the optical axis toward the object side during macro-focusing.

10. A zoom lens system capable of performing macro-photography, the system comprising, in the order from an object side:

a first lens unit that has positive optical power and is fixed during zooming;

a second lens unit that has negative optical power and is movable along an optical axis of the system during zooming;

a third lens unit that has positive optical power and is fixed during zooming; and a compensating unit to correct an image position after a change in image magnification during zooming, wherein the system is fixable at one of a plurality of focusing positions for a corresponding plurality of prescribed finite object distances, and one such prescribed finite object distance is a shortest finite object distance during zooming except for macro-photography;

wherein said second lens unit is movable along the optical axis from a focusing position corresponding to the shortest finite object distance toward the object side for an object having an object distance less than the shortest finite object distance to thereby perform macro-photography.

11. A lens system capable of performing macro-photography, the system comprising, in the order from an object side:

a first lens unit that has positive optical power;

a second lens unit that has negative optical power and is movable along an optical axis of the system, said second lens unit being provided at an image side of said first lens unit via an air gap;

a third lens unit that has positive optical power; and a fourth lens unit that has positive optical power, wherein the system is fixed at a focusing position corresponding to a finite object distance during zooming except for macro-photography;

wherein only said second lens unit is movable along the optical axis from the focusing position toward the object side for an object having an object distance less than the prescribed finite object distance to thereby perform macro-photography.

* * * * *